United States Patent
Kim et al.

(10) Patent No.: US 12,026,246 B2
(45) Date of Patent: Jul. 2, 2024

(54) ELECTRONIC APPARATUS AND METHOD OF CONTROLLING THE SAME

(71) Applicant: SAMSUNG ELECTRONICS CO., LTD., Suwon-si (KR)

(72) Inventors: Yongku Kim, Suwon-si (KR); Hyunsuk Min, Suwon-si (KR); Seokho Ban, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/124,627

(22) Filed: Mar. 22, 2023

(65) Prior Publication Data

US 2023/0229753 A1    Jul. 20, 2023

Related U.S. Application Data

(63) Continuation of application No. PCT/KR2021/012551, filed on Sep. 15, 2021.

(30) Foreign Application Priority Data

Sep. 24, 2020    (KR) .................. 10-2020-0123867

(51) Int. Cl.
*G06F 21/44*    (2013.01)
*G06F 3/0354*    (2013.01)
(Continued)

(52) U.S. Cl.
CPC .......... *G06F 21/44* (2013.01); *G06F 3/03545* (2013.01); *G06F 3/04162* (2019.05);
(Continued)

(58) Field of Classification Search
CPC ........ G06F 21/44; G06F 21/316; G06F 21/31; G06F 3/03545; G06F 3/04162;
(Continued)

(56) References Cited

U.S. PATENT DOCUMENTS

2004/0219902 A1    11/2004    Lee et al.
2006/0206717 A1    9/2006    Holt et al.
(Continued)

FOREIGN PATENT DOCUMENTS

JP    2001-338300    12/2001
JP    2012-048281    3/2012
(Continued)

OTHER PUBLICATIONS

International Search Report issued in International Application No. PCT/KR2021/012551 dated Dec. 3, 2021.
(Continued)

*Primary Examiner* — Christopher E Leiby
(74) *Attorney, Agent, or Firm* — STAAS & HALSEY LLP

(57) ABSTRACT

An electronic apparatus and a method of controlling the same, the electronic apparatus including: a display; and a processor configured to: receive a writing input for user authentication, identify writing content of the writing input and pen attribute of the writing input, perform the user authentication based on whether the identified writing content of the writing input and pen attribute of the writing input match writing content and pen attribute obtained in association with authentication data of a user registered prior to the writing input being received, and control the display to display an image based on the writing input according to which the user authentication has been performed.

15 Claims, 33 Drawing Sheets

(51) Int. Cl.
*G06F 3/041* (2006.01)
*G06F 3/04883* (2022.01)

(52) U.S. Cl.
CPC .... *G06F 3/04883* (2013.01); *G06F 2203/041* (2013.01); *G06F 2203/048* (2013.01)

(58) Field of Classification Search
CPC .. G06F 3/04883; G06F 3/0383; G06F 3/0482; G06F 3/0488; G06F 2203/041; G06F 2203/048
See application file for complete search history.

(56) References Cited

U.S. PATENT DOCUMENTS

| | | | |
|---|---|---|---|
| 2008/0113791 | A1 | 5/2008 | Williams et al. |
| 2008/0152202 | A1 | 6/2008 | Moise et al. |
| 2014/0043654 | A1 | 2/2014 | Hayashi |
| 2014/0294254 | A1 | 10/2014 | Kim et al. |
| 2015/0089228 | A1 | 3/2015 | Kim |
| 2015/0131874 | A1 | 5/2015 | Mettyear et al. |
| 2015/0205998 | A1 | 7/2015 | Suh et al. |
| 2018/0150627 | A1* | 5/2018 | Rodefer ............ G06F 3/04883 |
| 2018/0247108 | A1 | 8/2018 | Hong et al. |
| 2020/0225826 | A1 | 7/2020 | Yuk et al. |
| 2021/0216185 | A1* | 7/2021 | Ferris ............ G06V 30/347 |
| 2022/0374142 | A1* | 11/2022 | Kasatani ............ G06F 3/0416 |

FOREIGN PATENT DOCUMENTS

| | | |
|---|---|---|
| JP | 2014-130554 | 7/2014 |
| KR | 10-2007-0110335 | 11/2007 |
| KR | 10-2013-0029614 | 3/2013 |
| KR | 10-2014-0122295 | 10/2014 |
| KR | 10-2015-0026647 | 3/2015 |
| KR | 10-2015-0033053 | 4/2015 |
| KR | 10-2015-0083602 | 7/2015 |
| KR | 10-2015-0087959 | 7/2015 |
| KR | 10-1740574 | 5/2017 |
| KR | 10-2020-0088083 | 7/2020 |

OTHER PUBLICATIONS

Written Opinion issued in International Application No. PCT/KR2021/012551 dated Dec. 3, 2021.
Office Action dated Jan. 24, 2024 issued in European Application No. 21872821.0.

* cited by examiner

FIG. 5
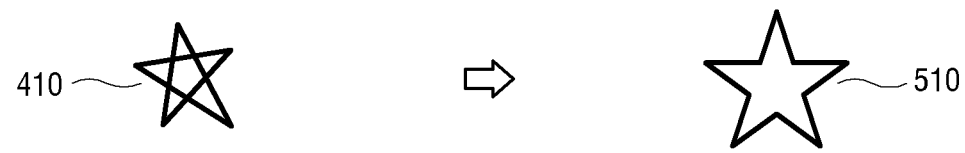

FIG. 15
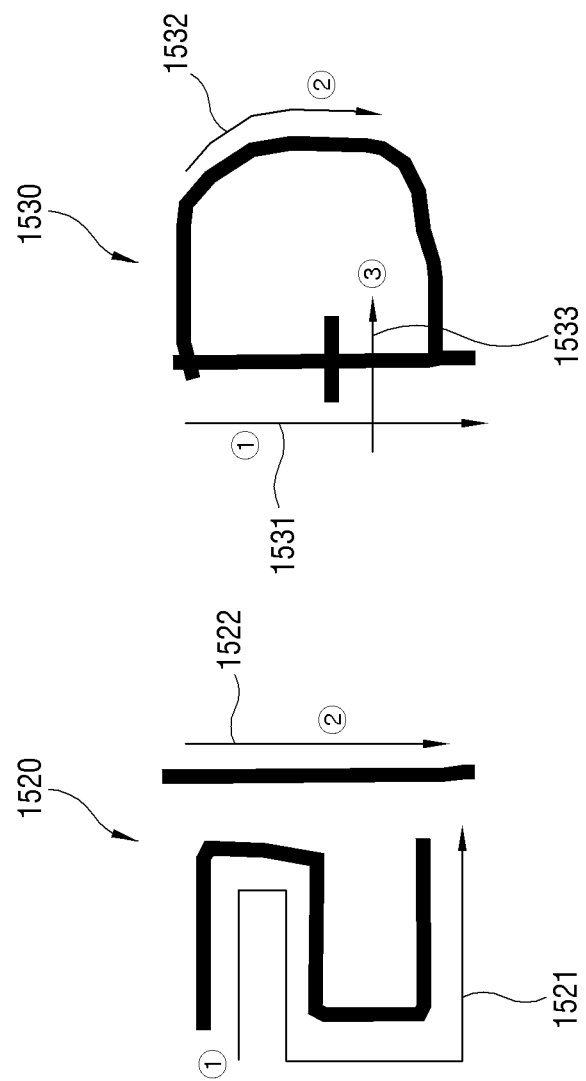
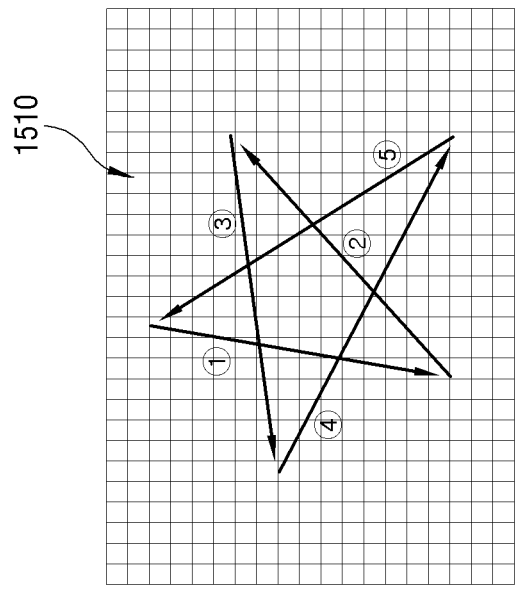

ELECTRONIC APPARATUS AND METHOD OF CONTROLLING THE SAME

CROSS-REFERENCE TO RELATED APPLICATION

This application is a continuation application, under 35 U.S.C. § 111(a), of International Application No. PCT/KR2021/012551, filed on Sep. 15, 2021, in the Korean Intellectual Property Office and is based on and claims priority to Korean Patent Application No. 10-2020-0123867 filed on Sep. 24, 2020 in the Intellectual Property Office, the disclosures of which are incorporated by reference herein in their entirety.

BACKGROUND

Field

The disclosure relates to an electronic apparatus and a method of controlling the same, and more particularly to an electronic apparatus capable of detecting a writing input based on a touch on a screen and a method of controlling the same.

Description of Related Art

An electronic apparatus with a display refers to an apparatus that processes data received from the outside or stored therein and displays an image, and has gradually become widespread in school, business, etc. as well as home.

The electronic apparatus supports various functions. For example, the electronic apparatus receives a writing input based on a touch of an electronic pen, a finger, etc. on a screen, and displays an image based on the writing input.

Various types of user authentication may be used for the security of the electronic apparatus. For example, authentication information such as a user identification (ID) and a password may be input by a keyboard and the like input device or based on a writing input, or a terminal or tag including the authentication information may be used.

The foregoing authentication systems may be restricted in use because an additional device such as the keyboard or a tag reader is required or the accuracy of recognition is low.

SUMMARY

According to an embodiment of the disclosure, there is provided an electronic apparatus including: a display; and a processor configured to: receive a writing input for user authentication, identify writing content of the writing input and pen attribute of the writing input, perform the user authentication based on whether the identified writing content of the writing input and pen attribute of the writing input match writing content and pen attribute obtained in association with authentication data of a user registered prior to the writing input being received, and control the display to display an image based on the writing input according to which the user authentication has been performed.

The pen attribute of the writing input comprises may include at least one of color, thickness or pen type of the image displayed on the display based on the writing input.

The processor may identify the pen attribute of the writing input based on an input of the user selecting any one pen attribute among a plurality of pen attributes.

The processor may control the display to display a user interface (UI) for the selecting of any one pen attribute among the plurality of pen attributes, and identifies the selecting from among the plurality of pen attributes based on the input of the user using the displayed UI.

The pen attribute of the writing input may be among a plurality of pen attributes, and the processor may control a plurality of UIs to be sequentially displayed by the display in correspondence with plural pen attributes of the writing input, and identify the plural pen attributes of the writing input based on an input of the user using the sequentially displayed UI.

The processor may further identify a position of the writing input, and perform the user authentication based on whether the identified position of the writing input matches a position of a writing input obtained in association with the authentication data of the user registered prior to the writing input being received.

The processor may identify the position of the writing input based on an area, in which the writing input is received, among a plurality of areas on the display.

The processor may further identify an input pattern of the writing input based on at least one of an order, a direction or a number of strokes making the writing input, and perform the user authentication based on whether the identified input pattern matches a pattern of a writing input obtained in association with the authentication data of the user registered prior to the writing input being received.

The processor may identify whether an input order of a plurality of writing inputs made in sequence matches a an order of writing inputs obtained in association with the authentication data of the user, and identify whether the input order of the writing content and pen attributes of the plurality of writing inputs match an order of writing content and pen attributes of the user registered prior to the plurality of writing inputs being input.

Meanwhile, according to an embodiment of the disclosure, there is provided a method of controlling an electronic apparatus, the method including: receiving a writing input for user authentication; identifying writing content of the writing input and pen attribute of the writing input; performing the user authentication based on whether the identified writing content of the writing input and pen attribute of the writing input match writing content and pen attribute obtained in association with authentication data of a user registered prior to the writing input being received; and displaying an image based on the writing input, according to which the user authentication has been performed, on a display.

The pen attribute of the writing input may include at least one of color, thickness or pen type of the image displayed on the display based on the writing input.

The identifying the pen attribute may include identifying the pen attribute of the writing input based on an input of the user selecting any one pen attribute among a plurality of pen attributes prior to the writing input being received.

The identifying the pen attribute may include displaying a UI for the selecting of any one pen attribute among the plurality of pen attributes on the display; and identifying the selecting from among the plurality of the pen attributes based on the input of the user using the displayed UI.

The pen attribute of the writing input is among plural pen attributes, and the identifying the pen attributes may include: sequentially displaying a plurality of UIs by the display in correspondence with the plural pen attributes of the writing input; and identifying the plural pen attributes of the writing input based on an input of the user using the sequentially displayed UI.

The method may further include identifying a position of the writing input, and the performing the user authentication may include performing the user authentication based on whether the identified position of the writing input matches a position of a writing input obtained in association with the authentication data of the user registered prior to the writing input being received.

The identifying the position of the writing input comprises identifying the position of the writing input based on an area, in which the writing input is received, among a plurality of areas on the display.

The method may further include identify an input pattern of the writing input based on at least one of an order, a direction or a number of strokes making the writing input, and the performing the user authentication may include performing the user authentication based on whether the identified input pattern matches a pattern of a writing input obtained in association with the authentication data of the user registered prior to the writing input being received.

Meanwhile, there is provided a computer-readable nonvolatile recording medium recorded with a program of a method implementable by a processor of an electronic apparatus, the method including: receiving a writing input for user authentication; identifying writing content of the writing input and pen attribute of the writing input; performing the user authentication based on whether the identified writing content of the writing input and pen attribute of the writing input match writing content and pen attribute obtained in association with authentication data of a user registered prior to the writing input being received; and displaying an image based on the writing input, according to which the user authentication has been performed, on a display.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 5 illustrates that writing content is identified in an electronic apparatus according to an embodiment of the disclosure.

FIG. 15 shows an example that an input pattern of a writing input is identified in an electronic apparatus according to an embodiment of the disclosure.

DETAILED DESCRIPTION

Figure 1:
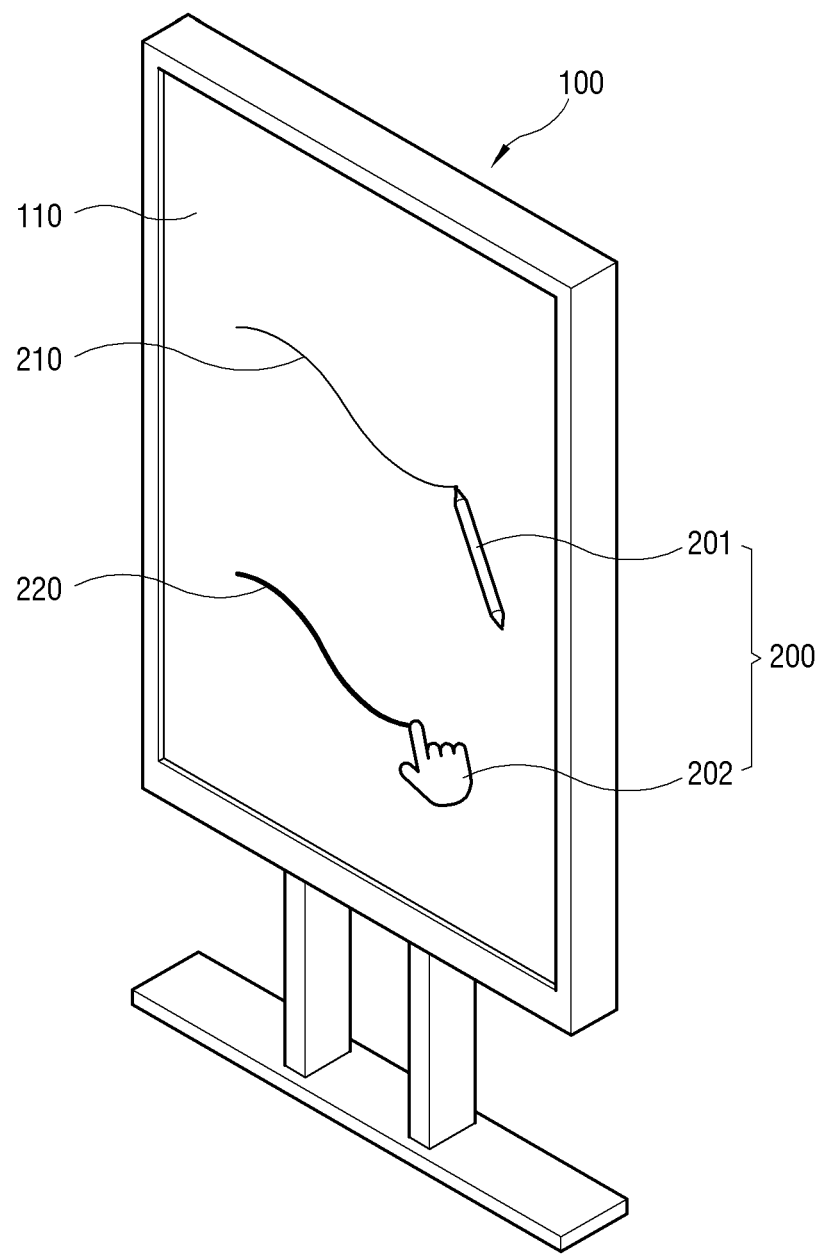
FIG. 1 illustrates an electronic apparatus according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

An aspect of the disclosure is to provide an electronic apparatus and a method of controlling the same, in which a user authentication system is provided having a high level of security and taking user convenience into account.

According to the disclosure, there are provided an electronic apparatus and a method of controlling the same, in which a user authentication system having a high level of security and improved in user convenience is provided using combination between writing content and pen attributes of a writing input.

FIG. 1 illustrates an electronic apparatus according to an embodiment of the disclosure.

An electronic apparatus 100 according to an embodiment of the disclosure is, as shown in FIG. 1, embodied as a touch screen apparatus in which a predetermined input unit 200 is used to make a touch input on a screen of a display 110 for displaying an image.

There are no limits to the types of input unit 200, and the input unit 200 according to an embodiment as shown in FIG. 1 includes an electronic pen 201 (or a digital pen), and a user's body 202 such as a thumb and one or more fingers, a palm, as various types of writing instruments for making pointing, i.e., touch input on the screen.

The electronic pen 201 may be implemented by, but not limited to, various shapes including a brush (e.g., a painting brush) as well as a pen.

The electronic pen 201 includes a passive type pen (or a passive pen), such as a general pen (e.g., a stylus), which has a shape extended in one direction, and an active type pen (or an active pen) which can autonomously generate a signal.

The passive pen's touch positions may be continuously identified by a sensor 120 (see FIG. 2) (to be described later) of the electronic apparatus 100 when one end of the passive pan gripped by a user touches the screen of the screen of the display 110. According to an embodiment, the passive pen may be configured to have two ends different in size (e.g., difference between the width and height of a cross section).

The active pen may for example have a structure for generating an electromagnetic field at a tip, and thus its touch positions are continuously identified in such a manner that the electronic apparatus 100 detects an electromagnetic field generated when the tip of the active pen gripped by a user touches (i.e., approaches or contacts) the screen of the display 110.

According to an embodiment, a user may make writing on the screen of the display 110, as a touch input using the input unit 200.

The writing includes drawing, and the electronic apparatus 100 may receive various writing inputs such as characters, numbers, symbols, figures, lines (straight or curved lines). According to the disclosure, there are no limits to the kinds/types of touch inputs. The touch inputs may be made continuously or discontinuously, and may include various kinds of touch inputs such as dragging, flicking, etc.

The electronic apparatus 100 displays writing images corresponding to the identified touch positions on the screen of the display 110. In other words, the electronic apparatus 100 may, as shown in FIG. 1, display the writing images 210 and 220 on the identified touch positions along the trace of a user's writing on the screen of the display 110 by the electronic pen 201 or the finger 202.

According to an embodiment, the electronic apparatus 100 may display writing images 210 and 220 corresponding to pen attributes (input attributes) set for the input unit 200 including the electronic pen 201.

The pen attributes include at least one of the color, thickness, or pen type of the displayed writing image. The pen type may also be called a tip type, and may include a general pen, a highlighter, a crayon, a brush (e.g., a painting brush), a spray, etc. In the electronic apparatus 100, the writing images 210 and 220 may be displayed corresponding to the set pen type (i.e., tip type). For example, when the pen type is set to the crayon, a writing image may be displayed on the display 110 as if it is written with the crayon.

According to an embodiment, the electronic apparatus 100 may further identify a touch width as well as the touch position of the electronic pen 201. The electronic apparatus 100 may continuously identify the touch widths at the moving touch positions through the sensor 120 (to be described later).

Further, when a user makes a writing input with a writing instrument other than a dedicated electronic pen, the electronic apparatus 100 according to an embodiment of the disclosure may display a writing image corresponding to a touch of the writing instrument.

According to an embodiment of the disclosure, the electronic apparatus 100 may be implemented as an interactive whiteboard (IWB) capable of receiving various touch inputs such as the writing input from a user, but the electronic apparatus 100 is not limited to this embodiment. In other words, the electronic apparatus 100 may be implemented as various touch screen apparatuses, which supports the touch input based on the input unit 200 on the screen thereof, for example, a TV, a monitor, a video wall, a tablet computer and the like smart pad, a smartphone, etc.

The electronic apparatus 100 implemented as the IWB or the TV may operate in any one of a plurality of screen modes based on the rotation of the display 110, in other words, may be switchable between a landscape mode and a portrait mode.

FIG. 1 illustrates that the display 110 of the electronic apparatus 100 implemented as the IWB is in the portrait mode by way of example, but the display 110 may be in the landscape mode with a rotatable structure.

According to an embodiment, the electronic apparatus 100 implemented as the IWB may include a separate main body connectable to the display 110 by a wire or wirelessly, so that an image can be displayed on the display 110.

According to an embodiment, the electronic apparatus 100 may include a single display 110. However, the electronic apparatus 100 according to the disclosure may include a plurality of displays, i.e., panels arranged in a matrix form to implement a large screen.

According to an embodiment, the electronic apparatus 100 may perform the functions of the IWB based on the execution of a predetermined built-in application.

The electronic apparatus 10 according to an embodiment of the disclosure receives a signal from an external signal source, for example, data about content, and processes the received data of content according to preset processes so as to be displayed as an image on the display 110.

According to an embodiment, the electronic apparatus 100 may include a TV that processes a broadcast image based on at least one among a broadcast signal, broadcast information or broadcast data received from a transmitter of a broadcasting station. In this case, the electronic apparatus 100 may include a tuner to be tuned to a channel corresponding to a broadcast signal.

However, the disclosure is not limited to the implementation example of the electronic apparatus 100. Alternatively, the electronic apparatus 100 may be implemented as an image processing apparatus such as a set-top box that transmits a signal to an external display connected by a wire or wirelessly. Alternatively, the electronic apparatus 100 may be implemented as a terminal apparatus with a display, such as a smart phone, a tablet, and a smart pad. Alternatively, the electronic apparatus 100 may be applied to a monitor for a desktop or laptop computer (or a personal computer (PC)).

When the electronic apparatus 100 is a TV, the electronic apparatus 100 may receive content based on at least one among a broadcast signal, broadcast information or broadcast data from a transmitter of a broadcasting station directly or through an additional apparatus connectable with the electronic apparatus 100 by a cable, for example, through a set-top box (STB), a one-connect box (OC box), a media box, etc. Here, the connection between the electronic apparatus 100 and the additional apparatus is not limited to the cable, but may employ various wired/wireless interfaces.

The electronic apparatus 100 may, for example, wirelessly receive a radio frequency (RF) signal, i.e., broadcast content transmitted from the broadcasting station. To this end, the electronic apparatus 100 may include an antenna for receiving a broadcast signal.

In the electronic apparatus 100, the broadcast content may be received through a terrestrial wave, a cable, a satellite, etc., and a signal source is not limited to the broadcasting station. In other words, any apparatus or station capable of transmitting and receiving data may be included in the source according to the disclosure.

Figure 2:
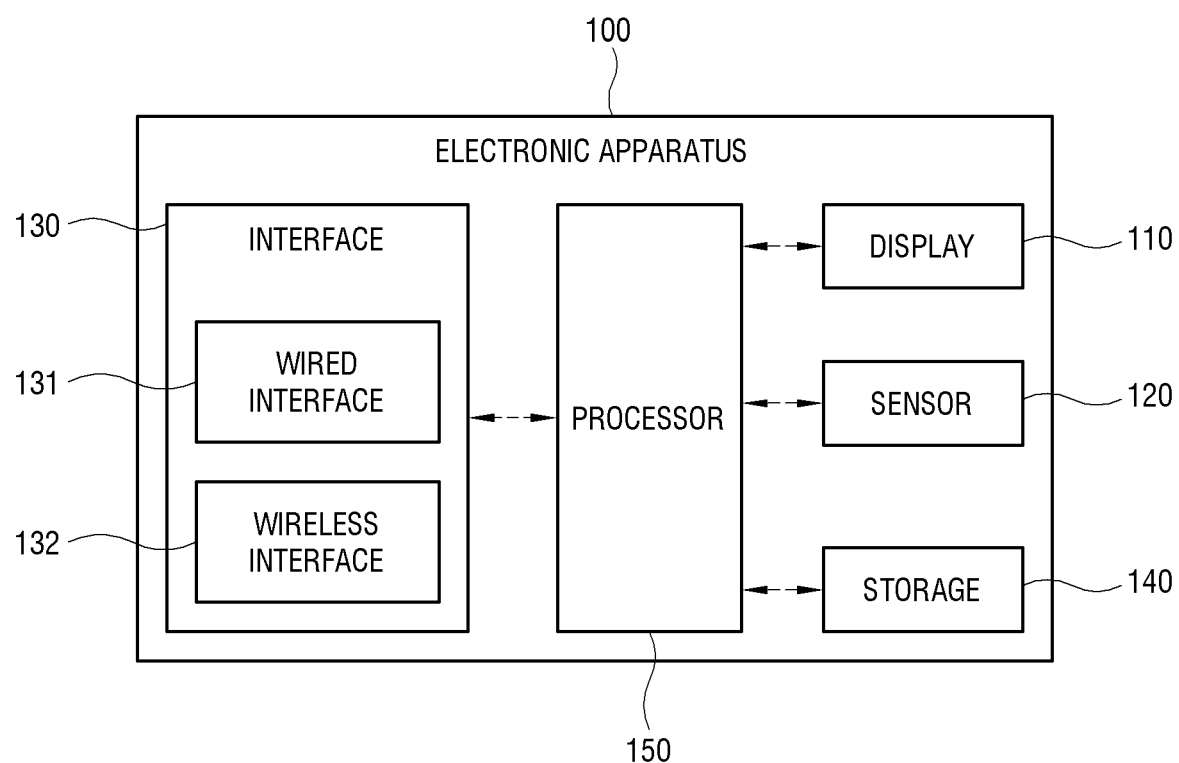
FIG. 2 is a block diagram showing the configuration of an electronic apparatus according to an embodiment of the disclosure.

Standards of a signal received in the electronic apparatus 100 may be varied depending on the types of the apparatus, and the electronic apparatus 100 may receive a signal as image content based on high definition multimedia interface (HDMI), HDMI-consumer electronics control (CEC), display port (DP), digital visual interface (DVI), composite video, component video, super video, DVI, Thunderbolt, RGB cable, syndicat des constructeurs d'appareils radioré-cepteurs et téléviseurs (SCART), universal serial bus (USB), or the like standards by a cable, according to the interface 130 (see FIG. 2).

According to an embodiment, the electronic apparatus 100 may be implemented as a smart TV or an Internet protocol (IP) TV. The smart TV refers to a TV that can receive and display a broadcast signal in real time, have a web browsing function to search and consume various pieces of content through the Internet while displaying the broadcast signal in real time, and provide a convenient user environment for this end. Further, the smart TV can provide an interactive service to a user because it includes an open software platform. Therefore, the smart TV can provide various pieces of content, for example, content of an application for a predetermined service to a user through the open software platform. Such an application refers to an application program for various kinds of services, for example, applications for social network service (SNS), finance, news, weather, map, music, movie, game, electronic book, and the like services.

The electronic apparatus 100 may process a signal to display a moving image, a still image, an application, an on-screen display (OSD), a user interface (UI) for controlling various operations, etc. on a screen based on a signal/data stored in an internal or external storage medium.

The electronic apparatus 100 may use wired or wireless network communication to receive content from various external apparatuses including a server 20 and a terminal apparatus as a source for providing content, but there are no limits to the kinds of communication. Specifically, the electronic apparatus 100 may use the wireless network communication to receive a signal corresponding to standards of Wi-Fi, Wi-Fi Direct, Bluetooth, Bluetooth low energy, Zigbee, UWB, NFC, etc. as image content corresponding to the type of the interface 130 (to be described later). Further, the electronic apparatus 100 may use Ethernet or the like wired network communication to receive a content signal.

Below, the configurations of the electronic apparatus according to an embodiment of the disclosure will be described with reference to the accompanying drawings.

FIG. 2 is a block diagram of an electronic apparatus according to an embodiment of the disclosure.

However, FIG. 2 merely shows the exemplary elements of the electronic apparatus 100 according to an embodiment of the disclosure, and the first electronic apparatus according to an alternative embodiment may include elements different from those of FIG. 2. In other words, the electronic apparatus 100 of the disclosure may include another element besides the elements shown in FIG. 2, or may exclude at least one element from the elements shown in FIG. 2. Further, the electronic apparatus 100 of the disclosure may be implemented by changing some elements of those shown in FIG. 2.

The electronic apparatus 100 according to an embodiment of the disclosure may, as shown in FIG. 2, include the display 110.

The display 110 may display an image.

The display 110 may be, but not limited to, for example implemented by various display types such as liquid crystal, plasma, light-emitting diode, organic light-emitting diode, surface-conduction electron-emitter, carbon nano-tube, nano-crystal, etc. According to an embodiment, the display 110 may include a display panel for displaying an image thereon, and further include additional elements, for example, a driver according to its types.

The electronic apparatus 100 may include the sensor 120.

The sensor 120 is provided in a certain area of the display 110, and detects a touch of the input unit 200 such as the electronic pen 201 on the screen of the display 110.

The sensor 120 obtains touch information about the electronic pen 201 on the screen of the display 110.

The touch information obtained by the sensor 120 is transmitted to a processor 150 (to be described later). The processor 150 may identify the touch position of the electronic pen 201 based on the received touch information. According to an embodiment, the processor 150 may further identify the touch width based on the touch information.

A method by which the sensor 120 detects a touch on the screen of the display 110 includes resistive, capacitive, surface acoustic wave (SAW), and infrared (IR) methods. The sensor 120 may include a detecting configuration necessary for at least one of the foregoing touch detecting methods.

The electronic apparatus 100 may include the interface 130.

The interface 130 allows the electronic apparatus 100 to communicate with various external apparatuses such as the server.

The interface 130 may include a wired interface 131. The wired interface 131 may include a connector for transmitting/receiving a signal/data based on the standards such as HDMI, HDMI-CEC, USB, Component, DP, DVI, Thunderbolt, RGB cables, etc. Here, the wired interface 131 may include at least one connector, terminal or port respectively corresponding to such standards.

The wired interface 131 is embodied to include an input port to receive a signal from the source or the like, and further include an output port as necessary to interactively transmit and receive a signal.

The wired interface 131 may include a connector, port, etc. based on video and/or audio transmission standards, such as an HDMI port, a DisplayPort, a DVI port, Thunderbolt, composite video, component video, super video, and SCART, so as to connect with an antenna for receiving a broadcast signal based on broadcast standards such as terrestrial/satellite broadcasts, or a cable for receiving a broadcast signal based on cable broadcast standards. Alternatively, the electronic apparatus 100 may include a built-in antenna for receiving a broadcast signal.

when a video/audio signal received through the interface 130 is a broadcast signal, the electronic apparatus 100 may further include a tuner to be tuned to the channels corresponding to the received broadcast signals. The tuner may include a demodulator that demodulates a broadcast signal of a certain tuned channel and outputs a signal in the form of a transport stream (TS). In other words, the tuner and the demodulator may be designed as a single integrated chip, or may be respectively designed as separated two chips.

The wired interface 131 may include a connector or port based on universal data transmission standards, such as a USB port. The wired interface 131 may include a connector or port to which an optical cable based on optical transmission standards is connectable. The wired interface 131 may include a connector or port to which an external microphone or an external audio device with a microphone is connected for the reception or input of an audio signal from the audio device. The wired interface 131 may include a connector or port to which a headset, an earphone, an external loudspeaker and the like audio device is connected for the transmission or output of an audio signal to the audio device. The wired interface 131 may include a connector or port based on network transmission standards such as Ethernet. For example, the wired interface 131 may be implemented as a local area network (LAN) connected to a router or a gateway by a wire.

The wired interface 131 is connected to a set-top box, an optical media reproducing device or the like external device, an external display apparatus, a loudspeaker, a server, etc. through the connector or port by 1:1 or 1:N (where, N is a natural number), thereby receiving a video/audio signal from the external device or transmitting a video/audio signal to the external device. The wired interface 131 may include connectors or ports for individually transmitting video/audio signals.

The wired interface 131 may be implemented by a communication circuitry including wireless communication modules (e.g., an S/W module, a chip, etc.) corresponding to various kinds of communication protocols.

According to an embodiment, the wired interface 131 may be built-in the electronic apparatus 100 or implemented as a dongle or a module and detachably connected to the connector of the electronic apparatus 100.

The interface 130 may include a wireless interface 132.

The wireless interface 132 may be variously implemented corresponding to the implementation of the electronic apparatus 100. For example, the wireless interface 132 may employ wireless communication methods such as radio frequency, Zigbee, Bluetooth, Wi-Fi, ultrawideband (UWB), near field communication (NFC), etc.

The wireless interface 132 may be implemented by a communication circuitry including wired or wireless communication modules (e.g., an S/W module, a chip, etc.) corresponding to various kinds of communication protocols.

According to an embodiment, the wireless interface 132 includes a wireless local area network (WLAN) unit. The WLAN unit may be wirelessly connected to external apparatuses through an access point (AP) under control of a processor 150. The WLAN unit includes a Wi-Fi communication module.

According to an embodiment, the wireless interface 132 includes a wireless communication module supporting one-to-one direct communication between the electronic apparatus 100 and the external apparatus wirelessly without the AP. The wireless communication module may be implemented to support Wi-Fi direct, BT, BLE, or the like communication method. When the electronic apparatus 100 performs direct communication with the external apparatus, a storage 140 may be configured to store identification information (e.g., media access control (MAC) address or Internet protocol (IP) address) about the external apparatus with which the communication will be performed.

In the electronic apparatus 100 according to an embodiment of the disclosure, the wireless interface 132 is configured to perform wireless communication with the external apparatus by at least one of the WLAN unit and the wireless communication module according to its performance.

According to an alternative embodiment, the wireless interface 132 may further include a communication module based on various communication methods such as long-term evolution (LTE) or the like mobile communication, electromagnetic (EM) communication including a magnetic field, visible light communication (VLC), etc.

The wireless interface 132 may wirelessly communicate with the external apparatus such as the server on the network, thereby transmitting and receiving a data packet to and from the external apparatus.

The wireless interface 132 may include an IR transmitter and/or an IR receiver to transmit and/or receive an IR signal according to IR communication standards. The wireless interface 132 may receive or input a remote-control signal from a remote controller or other external apparatuses or transmit or output a remote-control signal to other external apparatuses through the IR transmitter and/or IR receiver. Alternatively, the electronic apparatus 100 may exchange a remote-control signal with the remote controller or other external apparatuses through the wireless interface 132 based on another method such as Wi-Fi, BT, etc.

According to an embodiment, the wireless interface 132 may transmit predetermined data as information about a user voice received through the microphone 30 provided as a sound input unit 130 to the server or the like external apparatus. Here, there are no limits to the format/kind of data to be transmitted, and the data may, for example, include an audio signal corresponding to a voice uttered by a user, voice features extracted from the audio signal, etc.

Further, the wireless interface 132 may receive data based on a processing result of a corresponding user voice from the server or the like external apparatus. The electronic apparatus 100 may output a sound corresponding to the voice processing result through an internal or external loudspeaker provided as a sound output unit 140, based on the received data.

However, the foregoing embodiment is merely an example, and the user voice may be processed by the electronic apparatus 100 without being transmitted to the server. In other words, according to an alternative embodiment, the electronic apparatus 100 may be implemented to serve as a speech-to-character (STT) server.

The electronic apparatus 100 may communicate with the remote controller or the like input device through the wireless interface 132, and receive a sound signal corresponding to the user voice from the input device.

In the electronic apparatus 100 according to an embodiment, a communication module for communicating with the external server or the like and a communication module for communicating with the remote controller may be different from each other. For example, the electronic apparatus 100 may use an Ethernet modem or a Wi-Fi module to communicate with the server, and use a Bluetooth module to communicate with the remote controller.

In the electronic apparatus 100 according to an alternative embodiment, a communication module for communicating with the external server or the like and a communication module for communicating with the remote controller may be the same with each other. For example, the electronic apparatus 100 may use the Bluetooth module to communicate with the external apparatus and the remote controller.

According to an embodiment, the wireless interface 132 may be built-in the electronic apparatus 100 or implemented as a dongle or a module and detachably connected to the connector of the electronic apparatus 100.

The electronic apparatus 100 may include the storage 140.

The storage 140 may be configured to store various pieces of data of the electronic apparatus 100.

The storage 140 may be implemented by a nonvolatile memory (or a writable read only memory (ROM)) which can retain data even though the electronic apparatus 100 is powered off, and mirror changes. That is, the storage 140 may include one among a flash memory, an HDD, an erasable programmable ROM (EPROM) or an electrically erasable programmable ROM (EEPROM). The storage 140 may further include a volatile memory such as a dynamic random-access memory (DRAM) or a static random-access memory (SRAM), of which reading or writing speed for the electronic apparatus 100 is faster than that of the nonvolatile memory.

Data stored in the storage 140 may for example include not only an OS for driving the electronic apparatus 100 but also various programs, applications, image data, appended data, etc. executable on the OS.

Specifically, the storage 140 may be configured to store a signal or data input/output corresponding to operations of the elements under control of the processor 150. The storage 140 may be configured to store a control program for controlling the electronic apparatus 100, an application provided by the manufacturer or downloaded from the outside, a relevant UI/user experience (UX), graphics or images for providing the UI/UX, user information, documents, databases, or the concerned data.

According to an embodiment, the storage 140 may be configured to store a TV application or a TV client as a program for operating the electronic apparatus 100 as a TV, and a VOD application as a program for reproducing content received from the server and the like source.

According to an embodiment, the image displayed in the electronic apparatus 100 may be based on data stored in a flash memory, a hard disk, or the like nonvolatile storage 140. The storage 140 may be provided inside or outside the electronic apparatus 100, and the storage 140 provided outside may be connected to the electronic apparatus 100 via the wired interface 131.

According to an embodiment of the disclosure, the term 'storage' is defined to include the storage 140, the ROM (not shown) in the processor 150, a RAM (not shown) or a memory card (not shown, e.g., a micro-SD card, a memory stick, etc.) mountable to the electronic apparatus 100.

The electronic apparatus 100 may include the processor 150.

The processor 150 performs control to operate general elements of the electronic apparatus 100. The processor 150 may include a control program (or an instruction) for performing such control operations, a nonvolatile memory in which the control program is installed, a volatile memory to which at least a part of the installed control program is loaded, and at least one universal processor for executing the loaded control program, e.g., a microprocessor, an application processor, or a central processing unit (CPU).

The processor 150 may include a single-core processor, a dual-core processor, a triple-core processor, a quad-core processor, and the like multiple-core processor. The processor 150 may include a plurality of processors, for example, a main processor, and a sub processor that operates in a sleep mode (during which only standby power is supplied without operation of the display apparatus). Further, the processor, the ROM, and the RAM may be connected to one another through an internal bus.

According to an embodiment, the processor 150 may include an image processor that performs various processes preset for a content signal received from a source. The processor 150 outputs an output signal, which has been generated or combined by performing image processing, to the display 110, thereby displaying an image corresponding to an image signal on the display 110.

The image processor may include a decoder that decodes an image signal to match a video format of the electronic apparatus 100, and a scaler that adjusts the image signal to match the output format of the display 110.

According to an embodiment, the decoder may for example be implemented by an H.264 decoder, but not limited thereto. In other words, the video decoder in this embodiment may for example be implemented by a moving picture experts group (MPEG) decoder, a high efficiency video codec (HEVC) decoder, or the like decoders corresponding to various compression standards.

Further, there are no limits to the types of content to be processed by the image processor according to the disclosure. For example, the content processable by the image processor may further include not only a moving picture such as a video, but also a picture such as a JPEG file, a still image such as a wallpaper, a menu item such as a UI/a UX, and so on.

There are no limits to the kinds of image processing processes performed by the image processor according to the disclosure, and the image processor may for example perform at least one of various processes such as de-interlacing for converting an interlaced type broadcast signal into a progressive type broadcast signal, noise reduction for enhancing image quality, detail enhancement, frame refresh rate conversion, and line scanning.

According to an embodiment, the image processor may be implemented by an image board in which various chipsets, a memory, electronic parts, wiring, and the like circuit elements for performing such individual processes are mounted to a printed circuit board (PCB). In this case, the electronic apparatus 100 may include the tuner and the processor 150 including the image processor which are provided in a single image board. Of course, this is merely an example. Alternatively, the tuner and the processor 150 may be provided on a plurality of PCBs connected for communication with each other.

The processor 150 may process a broadcast signal so that an image of a predetermined channel can be displayed based on the processed signal. Further, the processor 150 may process a signal received from the server or the like external apparatus through the interface 130 so that an image of predetermined content can be displayed based on the processed signal.

According to an embodiment, the processor 150 may be implemented as included in the main SoC mounted to the PCB internally provided in the electronic apparatus 100

The control program may include a program(s) achieved by at least one of a BIOS, a device driver, an OS, a firmware, a platform, or an application. According to an exemplary embodiment, the application program may be previously installed or stored in the electronic apparatus 100 when the electronic apparatus 100 is manufactured, or may be installed in the electronic apparatus 100 on the basis of application data received from the outside when it is required in the future. The application data may for example be downloaded from an external server such as an application market to the electronic apparatus 100. Such an external server is merely an example of a computer program product according to the disclosure, but not limited thereto.

The control program may be recorded in a storage medium readable by a machine such as a computer. The machine-readable storage medium may be provided in the form of a non-transitory storage medium or a non-volatile storage medium. Here, the term 'non-transitory storage medium' means a tangible device and does not include a signal (e.g., an electromagnetic wave), and this term does not distinguish between a case where data is semi-permanently stored in the storage medium and a case where data is temporarily stored. For example, the 'non-transitory storage medium' may include a buffer in which data is temporarily stored.

Figure 3:
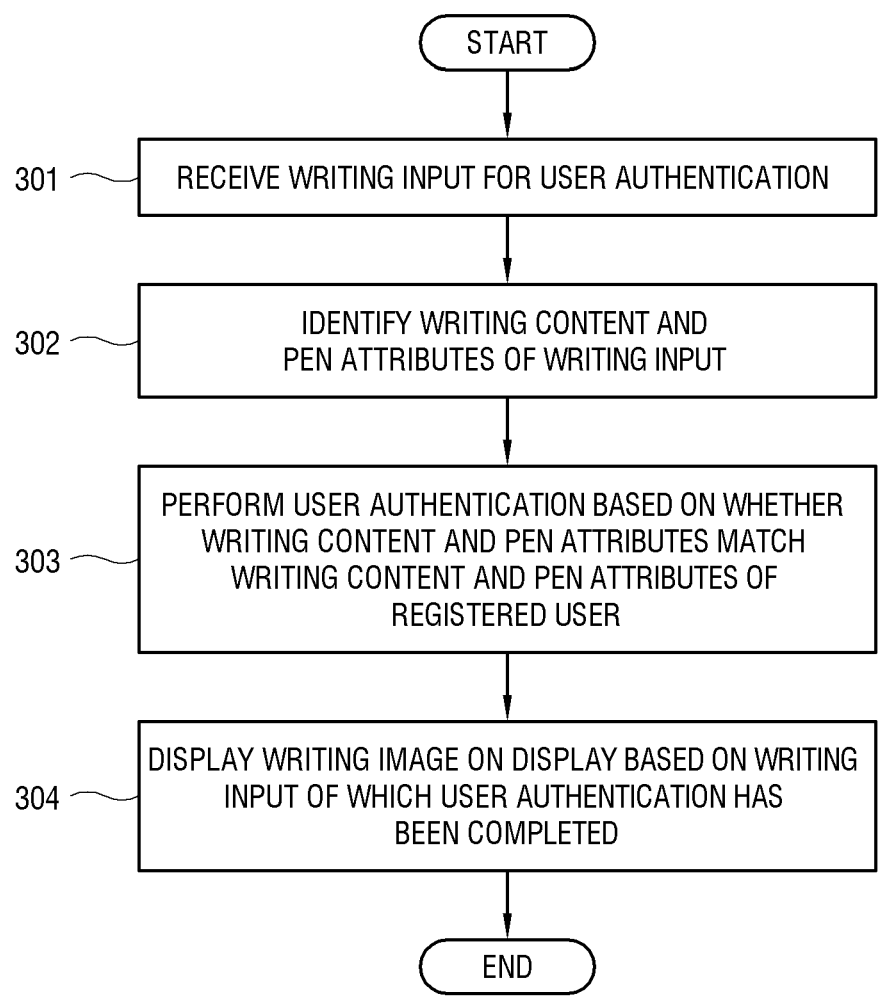
FIG. 3 is a flowchart showing operations of controlling an electronic apparatus according to an embodiment of the disclosure.

FIG. 3 is a flowchart showing operations of controlling an electronic apparatus according to an embodiment of the disclosure According to an embodiment of the disclosure, the processor 150 of the electronic apparatus 100 may, as shown in FIG. 3, receive a writing input for the user authentication (301).

Figure 4:
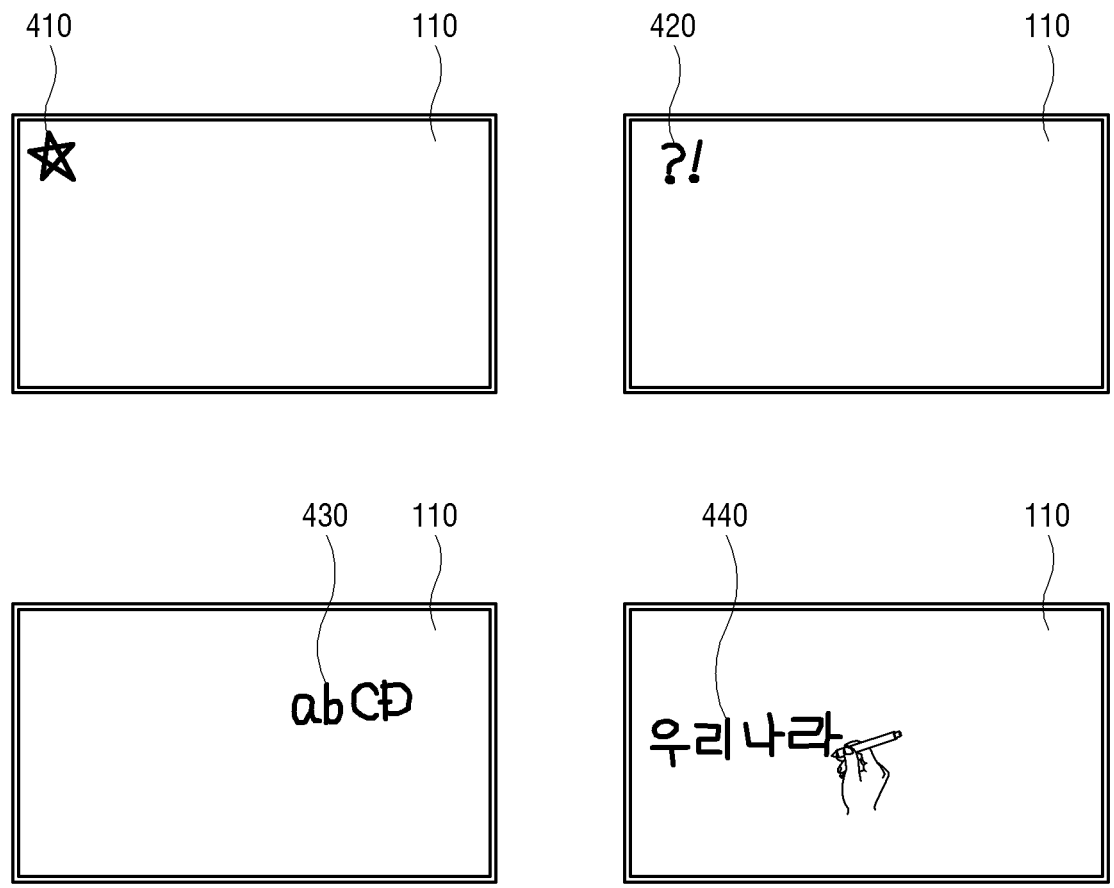
FIG. 4 shows examples of writing inputs received in an electronic apparatus according to an embodiment of the disclosure.

FIG. 4 shows examples of writing inputs received in an electronic apparatus according to an embodiment of the disclosure.

A user may make a writing input on the screen of the display 110 with the input unit 200 such as the electronic pen 201. The electronic apparatus 100 may, as shown in FIG. 4, receive various writing inputs 410, 420, 430, and 440 such as a character, a number, a symbol, a figure, a line (e.g., a straight or curved line).

The processor 150 may identify the writing content and the pen attribute of the writing input received in the operation 301 (302).

According to an embodiment, the processor 150 may sequentially identify the touch position, the touch width, etc. of the continuous touches received along the path of the writing input 410, 420, 430 or 440 based on the touch information detected by the sensor 120, thereby identifying the writing content (i.e., the content written on the whiteboard) and pen attributes of the writing input 410, 420, 430 or 440.

FIG. 5 illustrates that writing content is identified in an electronic apparatus according to an embodiment of the disclosure.

According to an embodiment, the processor 150 may identify a pattern formed along the path, i.e., the trace of the continuous touches, based on the identified values of the touch positions for the continuous touches of the writing inputs 410, 420, 430, and 440. The processor 150 compares the pattern identified as above with data, e.g., a reference pattern previously stored in the storage 140, thereby identifying the writing content 510, 520, 530 or 540 corresponding to the identified pattern.

The pen attributes may include at least one of the color, thickness or pen type (i.e., tip type) of the writing image displayed on the display 110 based on the writing input 410, 420, 430 or 440.

Figure 6:
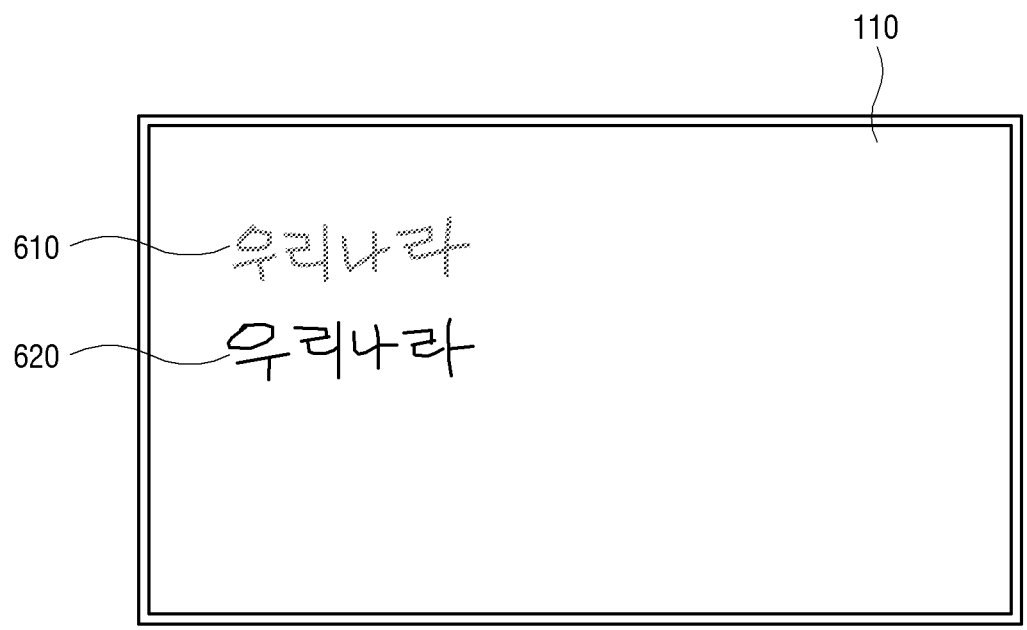
FIG. 6 shows an example of writing images different in pen attributes, i.e., color in an electronic apparatus according to an embodiment of the disclosure.
Figure 7:
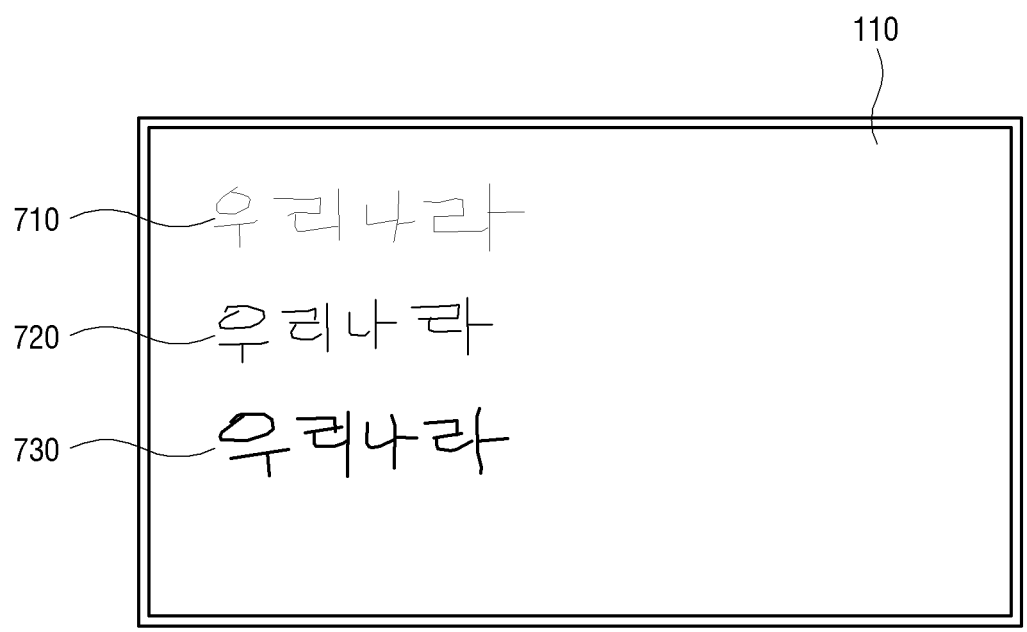
FIG. 7 shows an example of writing images different in pen attributes, i.e., thickness in an electronic apparatus according to an embodiment of the disclosure.
Figure 8:
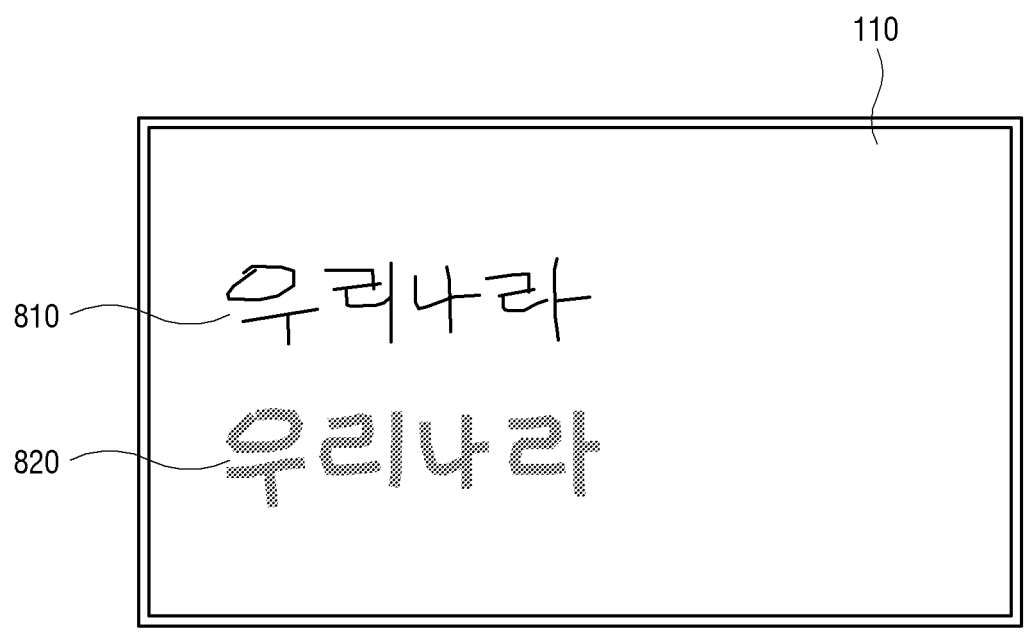
FIG. 8 shows an example of writing images different in pen attributes, i.e., pen type in an electronic apparatus according to an embodiment of the disclosure.

FIG. 6 shows an example of writing images different in pen attributes, i.e., color in an electronic apparatus according to an embodiment of the disclosure, FIG. 7 shows an example of writing images different in pen attributes, i.e., thickness in an electronic apparatus according to an embodiment of the disclosure, and FIG. 8 shows an example of writing images different in pen attributes, i.e., pen type (tip type) in an electronic apparatus according to an embodiment of the disclosure.

As shown in FIG. 6, the writing inputs 610 and 620 for a writing content of "우리나라" may be different in pen attribute, i.e., color from each other. Further, as shown in FIG. 7, the writing inputs 710, 720 and 730 for a writing content of "우리나라" may be different in pen attribute, i.e., thickness from each other. Further, as shown in FIG. 8, the writing inputs 810 and 820 for a writing content of " 우리나라" may be different in pen attribute, for example, pen types of a general pen and a highlighter, respectively.

The processor 150 may identify the pen attributes of the writing input having various pen types as described above.

According to an embodiment, the processor 150 may identify the pen attributes based on a user input of selecting any one of the plurality of pen attributes.

Specifically, the processor 150 may display a UI for the selection of the pen attributes, and identify the pen attributes corresponding to a user input made through the displayed UI.

Figure 9:
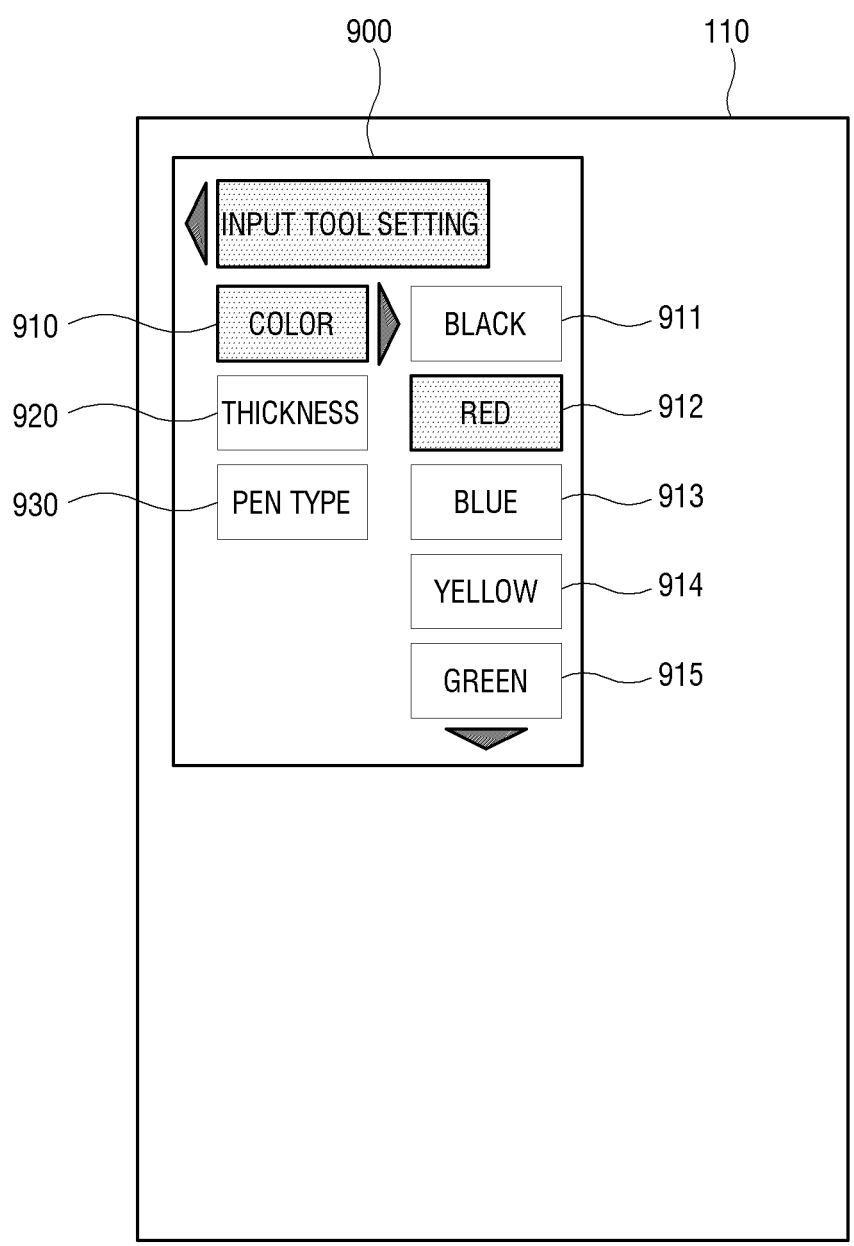
FIG. 9 shows an example of a user interface (UI) displayed for selecting pen attributes in an electronic apparatus according to an embodiment of the disclosure.
Figure 10:
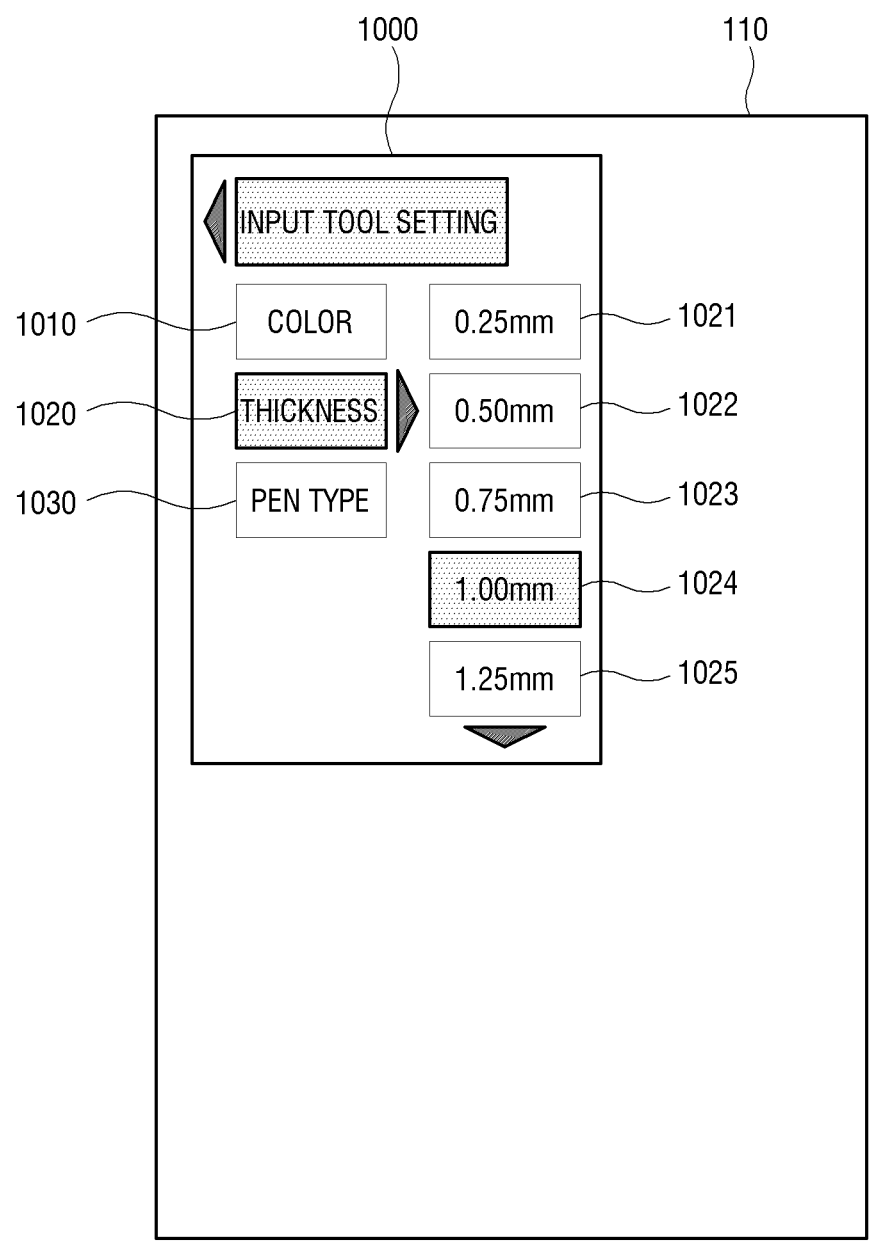
FIG. 10 shows another example of a UI displayed for selecting pen attributes in an electronic apparatus according to an embodiment of the disclosure.

FIG. 9 shows an example of a UI displayed for selecting pen attributes in an electronic apparatus according to an embodiment of the disclosure, and FIG. 10 shows another example of a UI displayed for selecting pen attributes in an electronic apparatus according to an embodiment of the disclosure.

As shown in FIGS. 9 and 10, the processor 150 may display UIs 900 and 1000 on the display 110 so as to set the pen attributes of the writing input.

Referring to FIG. 9, the UI 900 may include a plurality of menu items 910, 920 and 930 corresponding to the plurality of pen attributes and selectable by a user.

When receiving a user input for selecting one item 910, e.g., color among the plurality of menu items 910, 920 and 930, the processor 150 may display a plurality of submenu items 911, 912, 913, 914 and 915 corresponding to the item 910 selected by the user on the display 110.

Then, a user input for selecting one item 912, e.g., red among the displayed submenu items 911, 912, 913, 914 and 915 may be received, and the pen attributes may be set with the color corresponding to the user input.

Likewise, referring to FIG. 10, the processor 150 may receive a user input for selecting one item 1020, e.g., thickness among a plurality of menu items 1010, 1020 and 1030 corresponding to the plurality of pen attributes, and display a plurality of submenu items 1021, 1022, 1023, 1024 and 1025 corresponding to the selected item 1020 on the display 110. Then, a user input for selecting one item 1024, e.g., 1.00 mm among the displayed submenu items 1021, 1022, 1023, 1024 and 1025 may be received, and the pen attributes may be set with the thickness corresponding to the user input.

The electronic apparatus 100 may receive a user input through the UI for the plurality of pen attributes, i.e., the pen type (tip type) in the same manner as shown in FIG. 9 or 10. In other words, when the pen type 1030 among the plurality of menu items 1010, 1020 and 1030 is selected, a plurality of submenu items, for example, a general pen, a highlighter, a crayon, a brush (e.g., a painting brush), a spray, etc. corresponding to the pen type 1030 may be displayed, and the pen attributes may be set with the pen type corresponding to the selected item, e.g., the highlighter.

As described above, the electronic apparatus 100 according to an embodiment of the disclosure may sequentially display the plurality of UIs corresponding to the plurality of pen attributes, for example, color, thickness, pen type (or tip type), and identify the pen attributes of the writing input made on the screen of the display 110 in response to a user input received through each UI.

However, the method of identifying the pen attributes by the electronic apparatus 100 according to the disclosure is not limited to that based on the user input using the UI. For example, the electronic apparatus 100 may identify the number of pixels corresponding to the width of a touch for a writing input on the screen of the display 110, and identify the thickness as the pen attributes based on the identified number of pixels.

Referring back to FIG. 3, the processor 150 may perform user authentication based on whether the writing content and pen attributes identified in the operation 302 match the writing content and pen attributes of a registered user (303).

In other words, the processor 150 may control the user authentication to be normally performed in the electronic apparatus 100 only when both the writing content and pen attributes of the received writing input matches the writing content and pen attributes registered as authentication data (preset values) in advance.

According to an embodiment, the processor 150 may receive a plurality of writing inputs in sequence, and identify whether the writing content and pen attributes of the plurality of writing inputs match users' writing content and pen attributes registered as the authentication data.

Here, the processor 150 may identify whether an input sequence of the plurality of writing inputs matches preset values. In other words, the processor 150 may control the user authentication to be performed in the electronic apparatus 100 when the writing content and pen attributes of the plurality of writing inputs sequentially match users' writing content and pen attributes registered as the authentication data (or authentication information).

Based on the user authentication performed normally in the operation 303, the processor 150 may control the display 110 to display the writing image in response to the writing input for which the user authentication has been completed (304). Therefore, a user can variously use the electronic apparatus 100 based on the writing input.

According to an embodiment, the foregoing operations of the processor 150 may be implemented by a computer program stored in a computer program product (not shown) provided separately from the electronic apparatus 100.

In this case, the computer program product includes a non-transitory or nonvolatile memory in which an instruction corresponding to a computer program is stored, and a processor. When executed by the processor, the instruction includes control to receive a writing input for user authentication, identify the writing content and pen attributes of the writing input, perform the user authentication based on whether the identified writing content and pen attributes match the writing content and pen attributes of a registered user, and display a writing image on the display in response to the writing input for which the user authentication has been completed.

Therefore, the electronic apparatus 100 may download and execute a computer program stored in a separate computer program product, and perform the operations of the processor 150.

Further, according to an embodiment, the operations of the processor 150 may be carried out by a computer-readable program stored in the recording medium. The program, i.e., data stored in the recording medium may be directly accessed and executed by the processor 150, or downloaded and executed into the electronic apparatus 100 via a transmission medium implemented by a wired/wireless network in which the computer systems are connected to one another, thereby carrying out operations.

The processor 150 may perform at least a part of data analysis, processing, and result information generation through at least one of machine learning, a neural network, or a deep learning algorithm as a rule-based or AI algorithm to identify the writing content and pen attributes of the writing input, and identify whether to perform the user authentication based on the identified writing content and pen attributes.

For example, the processor 150 may function as a learner and a recognizer. For instance, the learner may perform a function of generating the trained neural network, and the recognizer may perform a function of recognizing (or inferring, predicting, estimating and identifying) the data based on the trained neural network. The learner may generate or update the neural network. The learner may obtain learning data to generate the neural network. For example, the learner may obtain the learning data from the storage 140 or from the outside. The learning data may be data used for the learning of the neural network, and, for example, the writing content, pen attributes, etc. of the writing input may be used as the learning data to train the neural network.

Before training the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data to generate the neural network which is set for performing the user authentication based on the writing content and pen attributes of the writing input.

The trained neural network may include a plurality of neural networks (or layers). The nodes of the plurality of neural networks have weight values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the processor 150 of the electronic apparatus 100 according to an embodiment of the disclosure may identify the position (i.e., the position on the whiteboard) of the writing input, and perform the user authentication further based on whether the identified position matches the position of the writing input of the registered user. Here, the processor 150 may identify an area, in which the writing input is received, among a plurality of areas divided on the display 110 as the position of the writing input.

Figure 11:
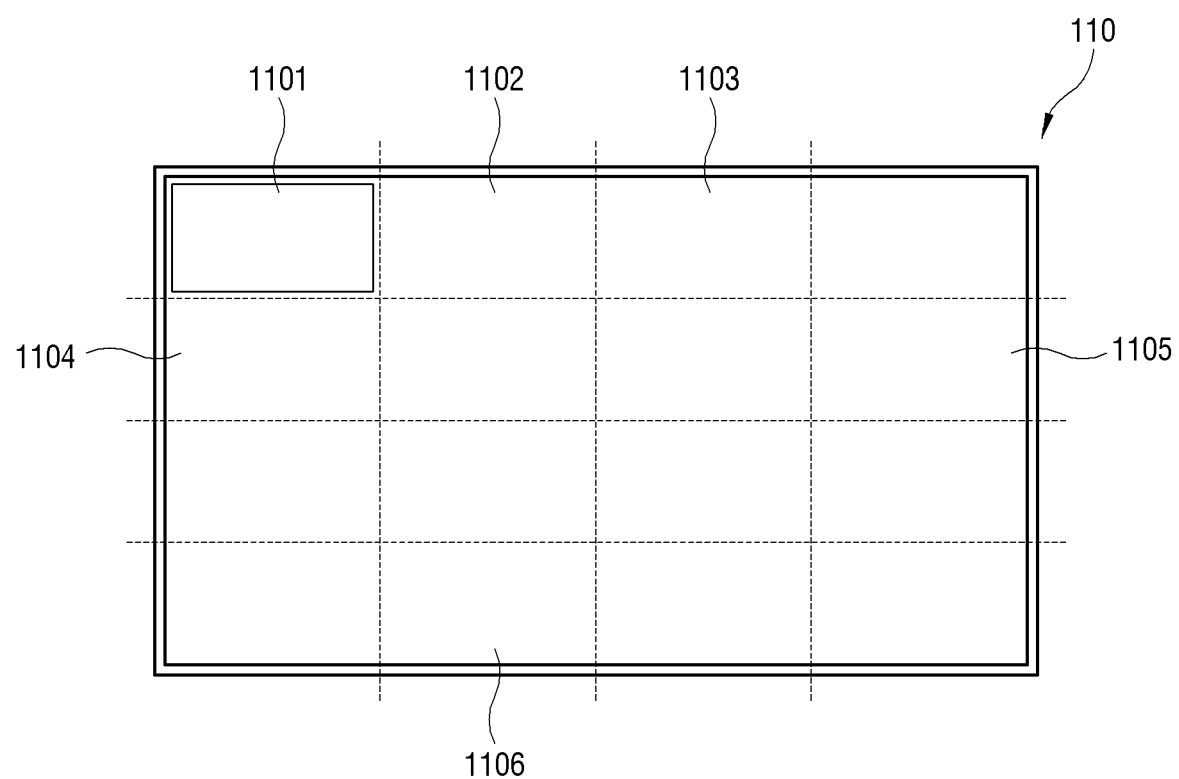
FIG. 11 illustrates that a display is divided into a plurality of areas in an electronic apparatus according to an embodiment of the disclosure.
Figure 12:
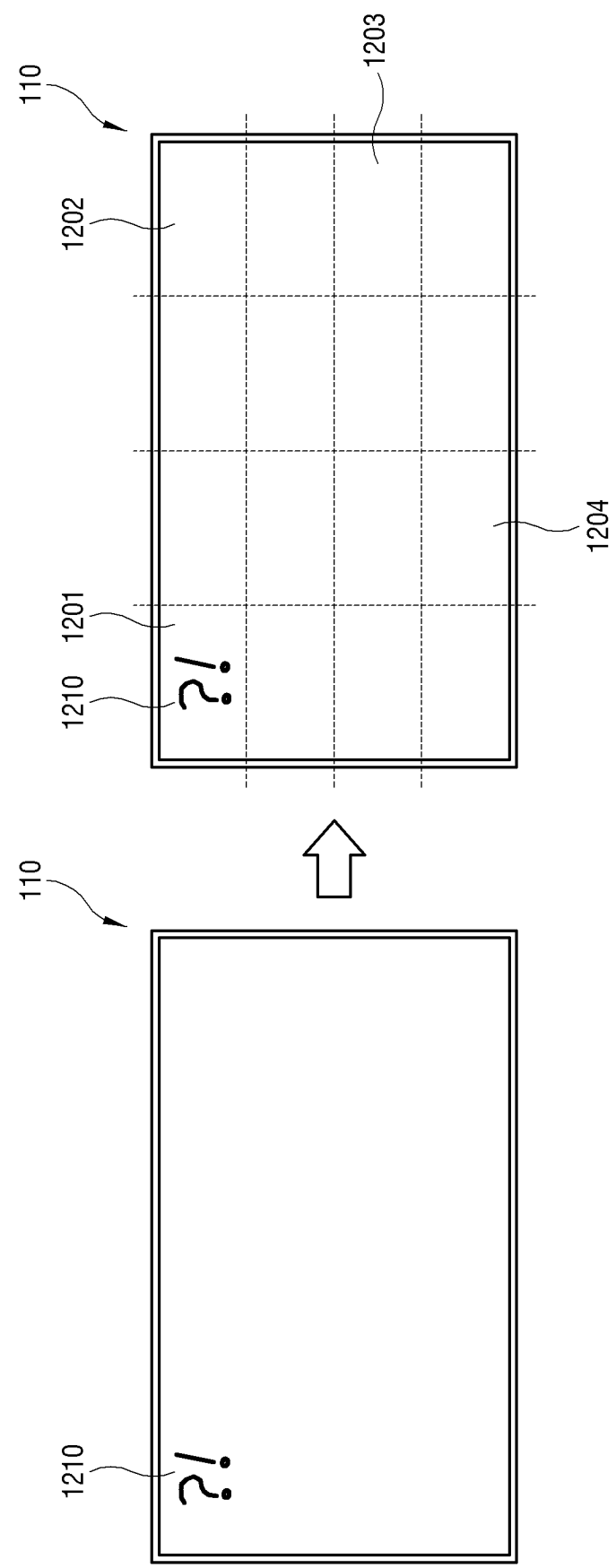
FIG. 12 shows an example of identifying the position of a writing input in an electronic apparatus according to an embodiment of the disclosure.
Figure 13:
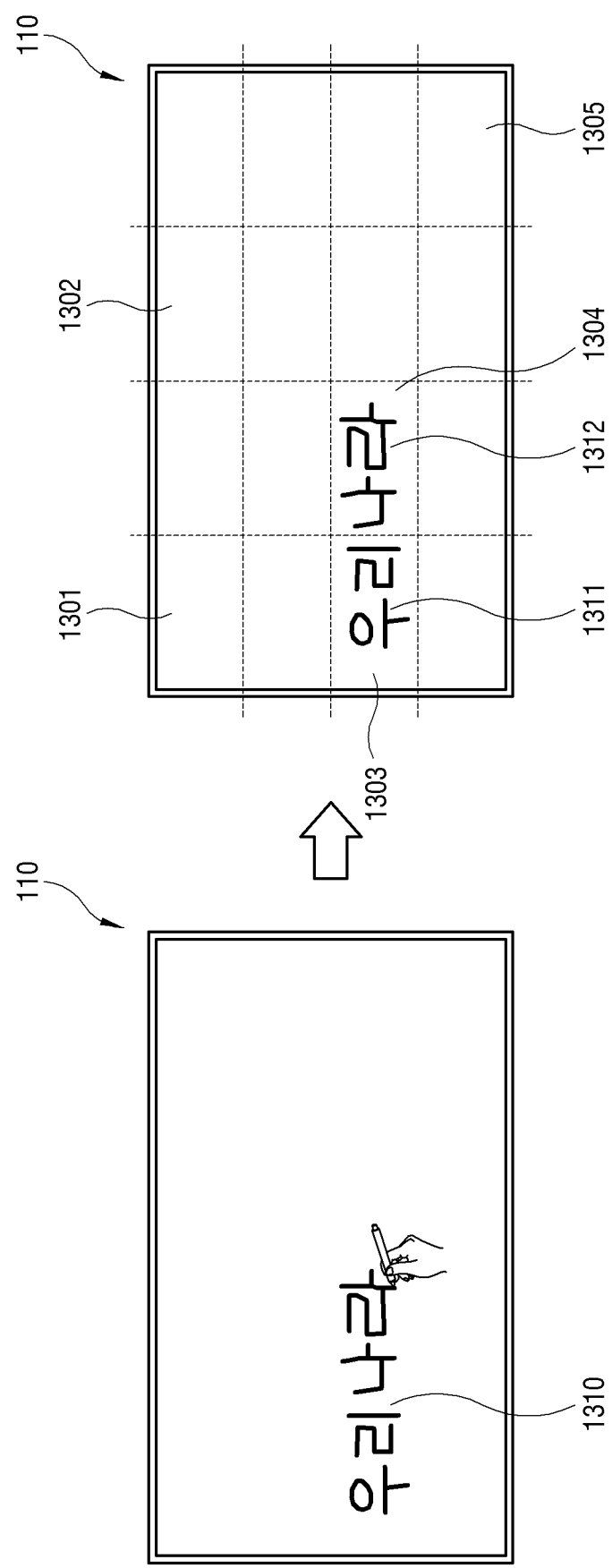
FIG. 13 shows another example of identifying the position of a writing input in an electronic apparatus according to an embodiment of the disclosure.

FIG. 11 illustrates that a display is divided into a plurality of areas in an electronic apparatus according to an embodiment of the disclosure, FIG. 12 shows an example of identifying the position of a writing input in an electronic apparatus according to an embodiment of the disclosure, and FIG. 13 shows another example of identifying the position of a writing input in an electronic apparatus according to an embodiment of the disclosure.

As shown in FIG. 11, the display 110, i.e., the screen of the electronic apparatus 100 may be divided into a plurality of areas 1101, 1102, 1103, 1104, 1105 and 1106.

A user may use the electronic pen 201 to write a character, a number, a symbol or the like at a certain position on the display 110 divided into the plurality of areas 1101, 1102, 1103, 1104, 1105 and 1106.

The processor 150 may identify at least one area, in which the writing is received, among the plurality of areas 1101, 1102, 1103, 1104, 1105 and 1106 of the display 110 as the position of the writing input.

For example, the processor 150 may, as shown in FIG. 12, receive a symbol of "?!" as a writing input 1210 at a certain position on the display 110, and identify an area 1201, in which the writing input 1210 is made, among a plurality of areas 1201, 1202, 1203 and 1204 as the position of the writing input.

As another example, the processor 150 may, as shown in FIG. 13, receive a character i.e., Korean character of "우리나라" as a writing input 1310 at a certain position on the display 110, and identify areas 1303 and 1304, in which the writing input 1310 is made, among a plurality of areas 1301, 1302, 1303, 1304 and 1305 as the position of the writing input. Here, the processor 150 may divisionally identify the areas 1303 and 1304 in which parts 1311 and 1312 of the writing input are separately received.

According to an embodiment, the processor 150 may perform the user authentication based on matching between the writing content (i.e., the content written on the whiteboard), the writing position (i.e., the position on the whiteboard), and the pen attributes (i.e., the input attributes) of the writing input made by a user and the writing content (i.e., the content written on the whiteboard), the writing position (i.e., the position on the whiteboard) and the pen attributes (i.e., the input attributes) of the user previously registered as the authentication data (i.e., the preset values). In other words, the processor 150 may further identify the writing position of the writing input as well as the writing content and the pen attributes, and further identify the matching of the writing position in the operation S303 of FIG. 3.

According to an embodiment, the authentication data, i.e., the preset values for the user authentication may be differently set according to screen modes of the display 110.

Figure 14:
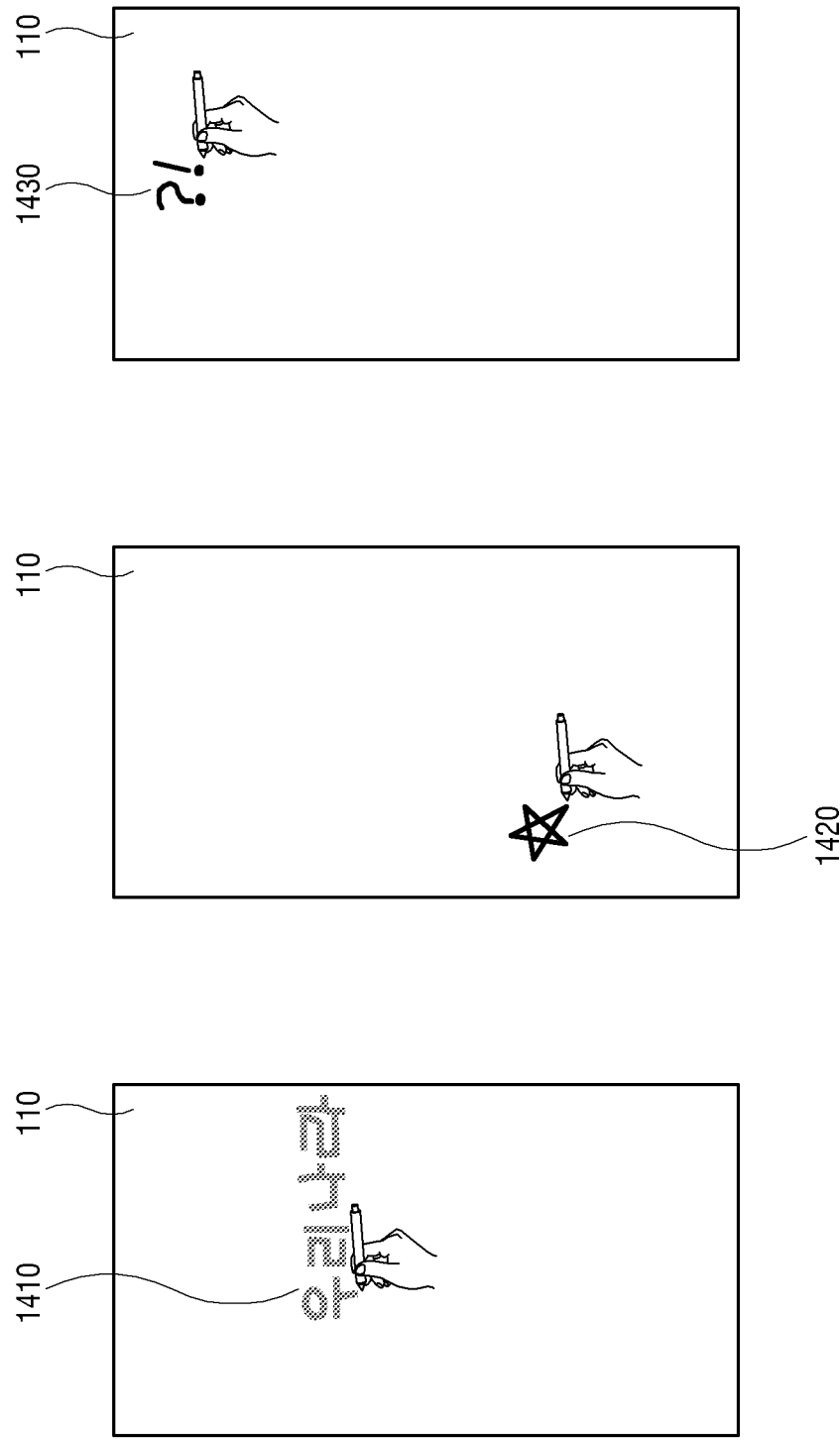
FIG. 14 shows an example that user authentication is performed in a portrait mode of an electronic apparatus according to an embodiment of the disclosure.

FIG. 14 shows an example that user authentication is performed in a portraying mode of an electronic apparatus according to an embodiment of the disclosure.

When receiving the writing input for the user authentication, the processor 150 may further identify a screen mode of the display 110 as a portrait mode as well as the writing content and pen attributes of the writing input.

The processor 150 may identify whether the identified writing content and pen attributes match the writing content and pen attributes of a user registered as the authentication data for the identified screen mode, i.e., the portrait mode.

For example, when a plurality of writing inputs 1410, 1420 and 1430, such as a character i.e., Korean character of "우리나라" a figure of "star (or pentagonal start)," and a symbol of "?!" are input in sequence while the screen mode of the electronic apparatus 100 is the portrait mode, the processor 150 may compare the writing content and pen attributes of the writing inputs 1410, 1420 and 1430 with the authentication data (or authentication information) for the portrait mode in input order, thereby identifying the matching.

In the same manner, when the screen mode of the display 110 is identified as the landscape mode, the processor 150 may identify whether the writing content and the pen attributes match the writing content and pen attributes of a user registered as the authentication data for the identified screen mode, i.e., the landscape mode.

According to an embodiment, the processor 150 of the electronic apparatus 100 may further identify the input pattern of the writing input, and perform the user authentication further based on matching between the identified input pattern and the pattern of the writing input of the registered user. Here, the input pattern of the writing input may be identified based on at least one of the order, direction or number of strokes made for the writing input.

FIG. 15 shows an example that an input pattern of a writing input is identified in an electronic apparatus according to an embodiment of the disclosure.

As shown in FIG. 15, a user may write, i.e., draw a figure of "star" as a writing input 1510, and the processor 150 may perform the user authentication when the number of strokes (lines) and the order of drawing the strokes ①, ②, ③, ④, and ⑤ for the writing input 1510 match the pattern of the writing input of the user previously registered as the authentication data.

As another example, a user may write a character i.e., Korean character of "리" as a writing input 1520, and the processor 150 may perform the user authentication when the number and directions ①　and ②　of strokes 1521 and 1522 for the writing input 1520 match the pattern of the writing input of the user previously registered as the authentication data.

As still another example, a user may write a character of "D" as a writing input 1530, and the processor 150 may perform the user authentication when the number, order and directions ①, ②　and ③　of strokes 1531, 1532 and 1533 for the writing input 1530 match the pattern of the writing input of the user previously registered as the authentication data.

Below, an embodiment of setting authentication information for the user authentication, and performing the user authentication based on the set authentication information will be described.

Figure 16:
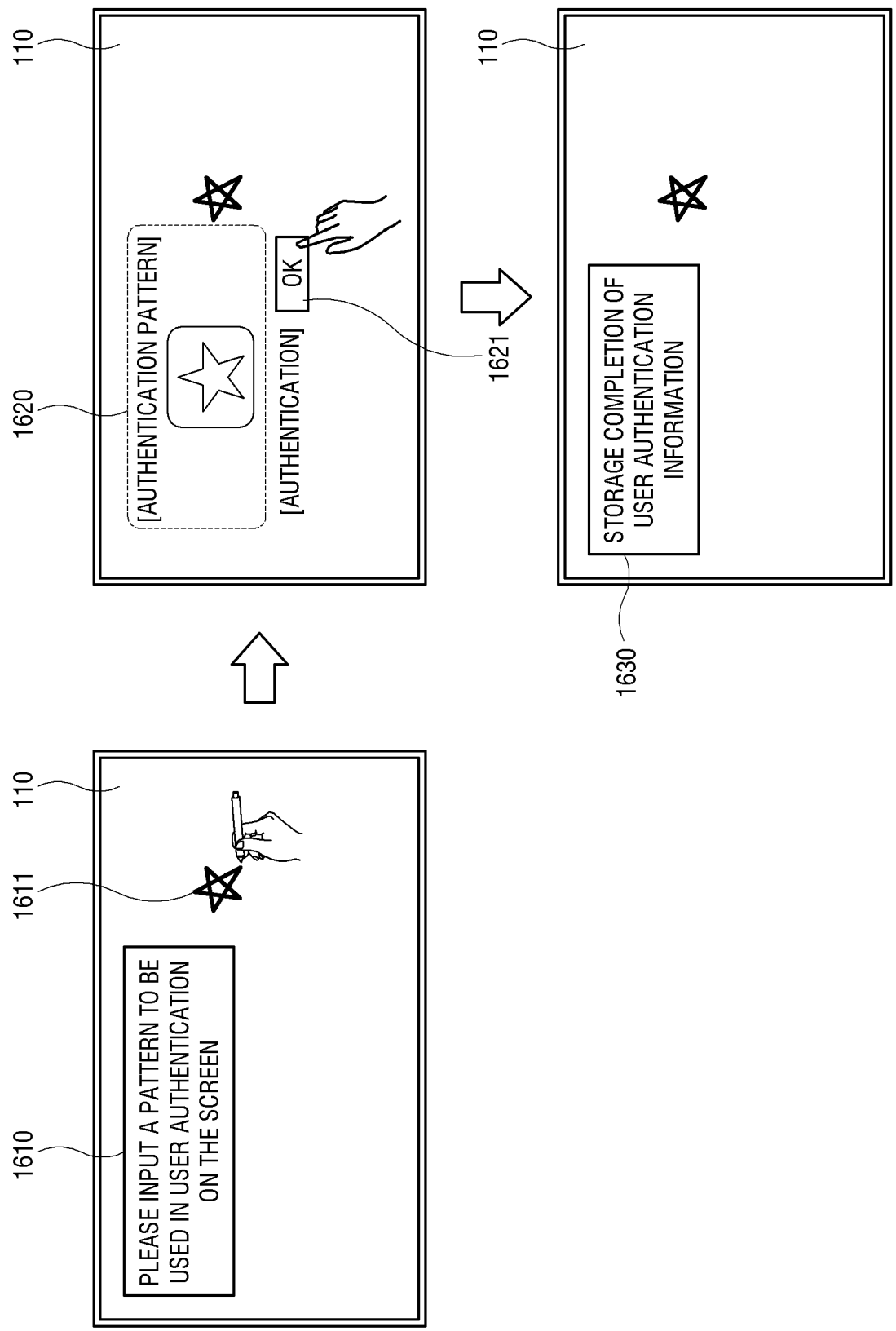
FIG. 16 shows an example that authentication information is set in an electronic apparatus according to an embodiment of the disclosure.

FIG. 16 shows an example that authentication information is set in an electronic apparatus according to an embodiment of the disclosure.

According to an embodiment, a user may select an authentication information setting menu of the electronic apparatus 100, and set authentication information for the user authentication.

As the authentication information setting menu is selected, the processor 150 may, as shown in FIG. 16, control the display 110 to display a UI 1610 for guiding the setting of the authentication information. Here, a display position of the UI 1610 is not limited but movable within the display 110.

In response to the displayed UI 1610, a user may draw a figure of "star" as a writing input 1611 to be used for the authentication information in a certain area of the display 110 through the input unit 200 such as the electronic pen 201. Here, the processor 150 may register the writing input 1611 as the authentication information when it is identified that the same starlike writing input 1611 is input twice or more.

The processor 150 may identify the authentication information by identifying the writing content and pen attributes of the received writing input 1611, and display the identified authentication information as an authentication pattern 1620 on the display 110 for a user's confirmation. Here, the authentication information may further include information about the position of the writing input 1611, for example, an area where the writing input 1611 is received among the divisional areas on the display 110 as well as the writing content and the pen attributes.

When a user confirms that the displayed authentication pattern 1620 is okay 1621, the authentication information (i.e., the authentication pattern) may be stored in the storage 140 as the authentication information (i.e., the authentication data) of the registered user.

Figure 17:
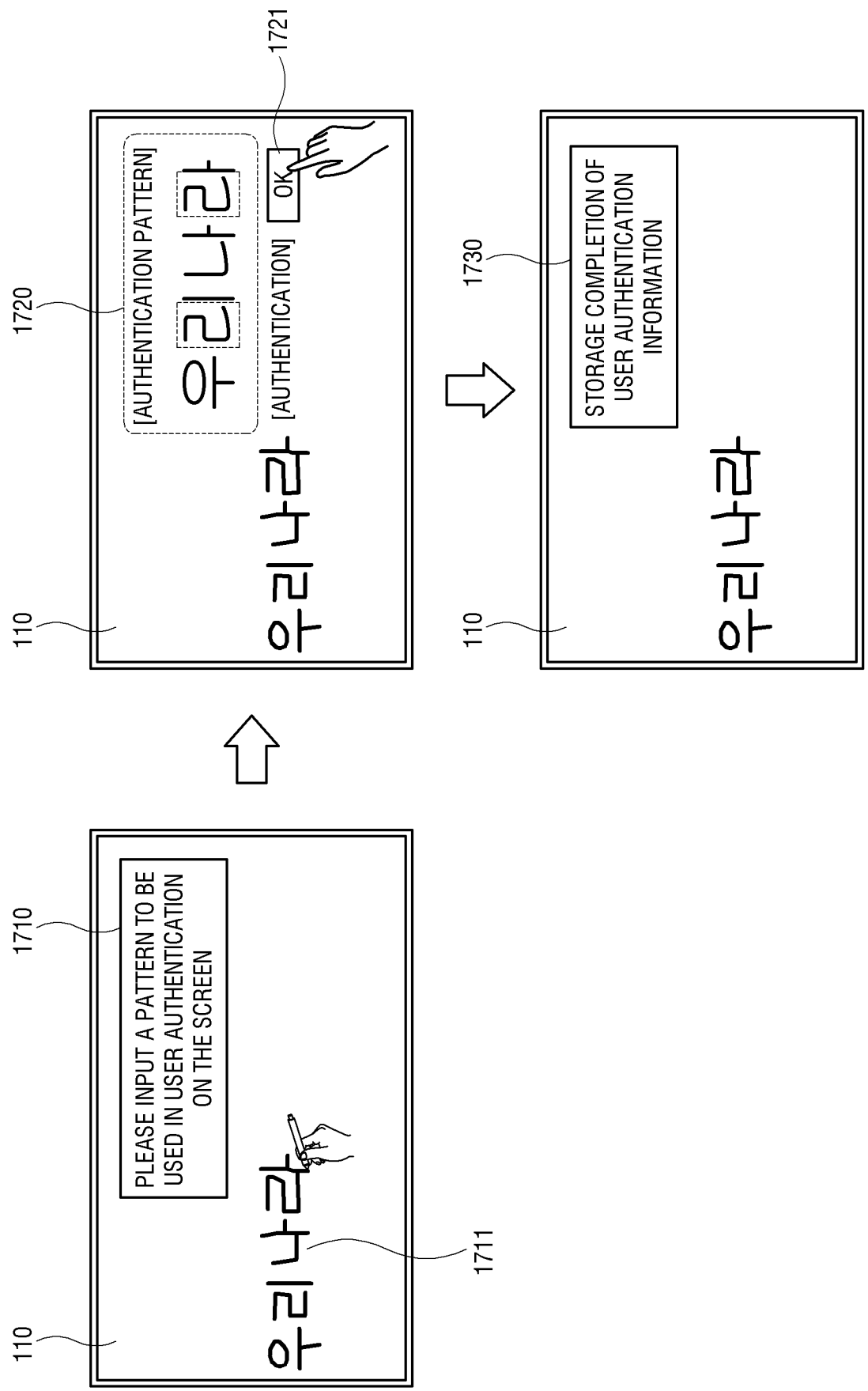
FIG. 17 shows another example that authentication information is set in an electronic apparatus according to an embodiment of the disclosure.

FIG. 17 shows another example that authentication information is set in an electronic apparatus according to an embodiment of the disclosure.

The processor 150 may control the display 110 to display a UI 1710 for guiding the setting of the authentication information as shown in FIG. 17, as a user selects the authentication information setting menu as described with reference to FIG. 16, In response to the displayed UI 1710, a user may write a character i.e., Korean character of "우리나라" as a writing input electronic pen 201.

The processor 150 may identify the authentication information by identifying the writing content and pen attributes of the received writing input 1711, and display the identified authentication information as an authentication pattern 1720 on the display 110 for a user's confirmation. Here, the authentication information may further include information about the position of the writing input 1711, for example, an area where the writing input 1711 is received among the divisional areas on the display 110 as well as the writing content and the pen attributes.

When a user confirms that the displayed authentication pattern 1720 is okay 1721, the authentication information (i.e., the authentication pattern) may be stored in the storage 140 as the authentication information (i.e., the authentication data) of the registered user.

According to an embodiment, the electronic apparatus 100 may register sequential combinations of the plurality of writing inputs, for example, the writing inputs 1611 and 1711 of FIGS. 16 and 17 as the authentication information for the user authentication. Therefore, the processor 150 may perform the user authentication by receiving the plurality of writing inputs from a user, and comparing the writing content and pen attributes of the received writing inputs with the registered authentication information in sequence.

Figure 18:
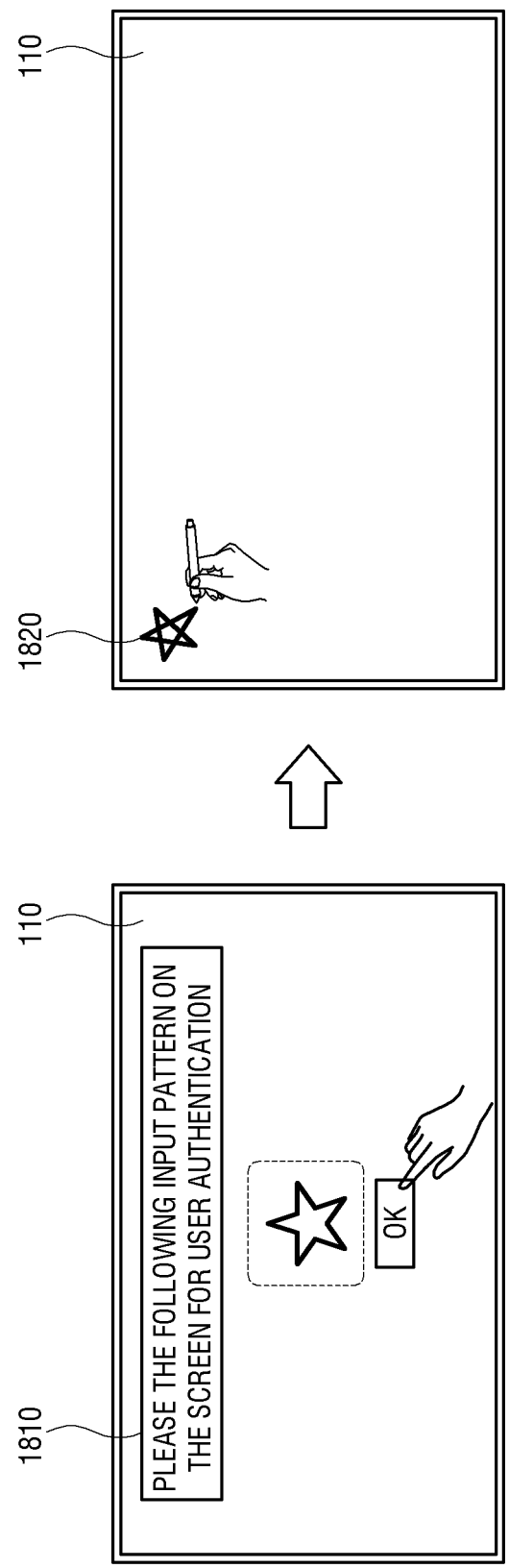
FIG. 18 shows an example that a writing input for user authentication is received in an electronic apparatus according to an embodiment of the disclosure.

FIG. 18 shows an example that a writing input for user authentication is received in an electronic apparatus according to an embodiment of the disclosure.

According to an embodiment, a user may select the user authentication menu of the electronic apparatus 100, and make the writing input for the user authentication.

As the user authentication menu is selected, the processor 150 may, as shown in FIG. 18, control the display 110 to display a UI 1810 for guiding the writing input to be made corresponding to the authentication information.

In response to the displayed UI 1810, a user may draw a figure of "star" as a writing input 1820 for the user authentication in a certain area of the display 110 through the input unit 200 such as the electronic pen 201.

The processor 150 may identify the writing content and pen attributes of the received writing input 1820, and identify whether the identified writing content and pen attributes match the writing content and pen attributes of the user registered as the authentication information. Here, the authentication information set in the embodiment shown in FIG. 16 may be used. Further, the processor 150 may additionally identify whether the position of the writing input 1820, for example, an area where the writing input 1820 is received among the divisional areas on the display 110 matches the position of the writing input registered as the authentication information, as well as the writing content and the pen attributes.

Figure 19:
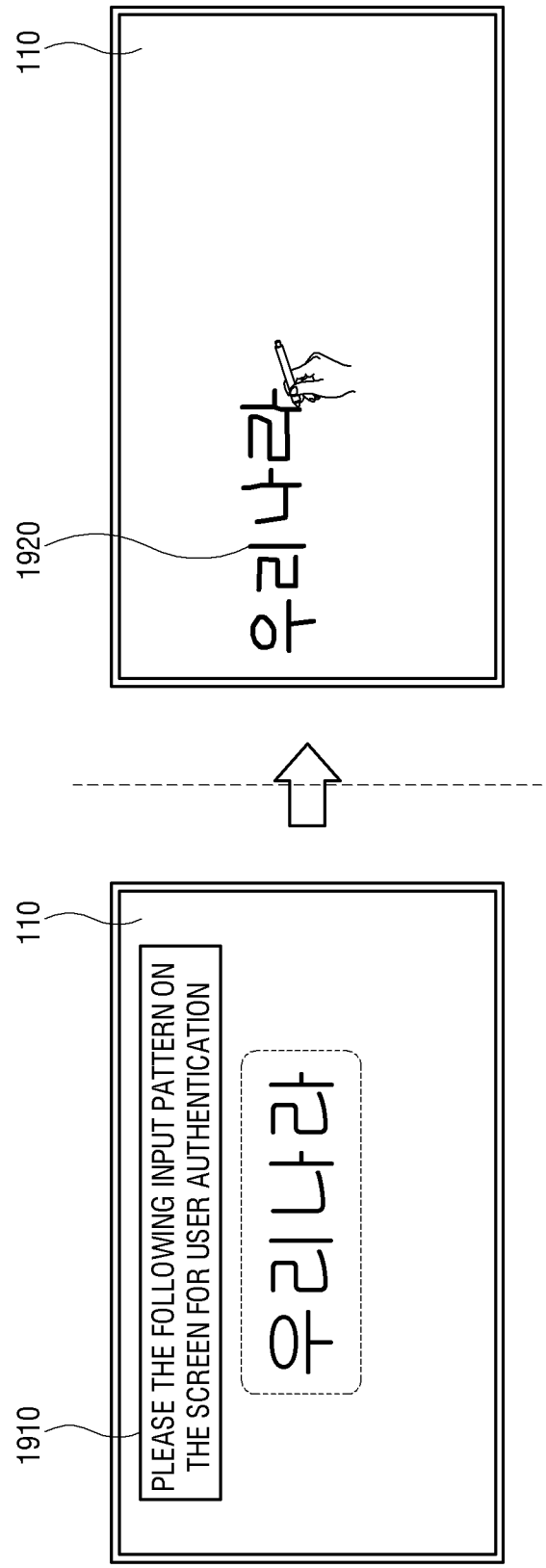
FIG. 19 shows another example that a writing input for user authentication is received in an electronic apparatus according to an embodiment of the disclosure.

FIG. 19 shows another example that a writing input for user authentication is received in an electronic apparatus according to an embodiment of the disclosure.

As the user authentication menu is selected as described with reference to FIG. 18, the processor 150 may control the display 110 to display a UI 1910 for guiding the writing input to be made corresponding to the authentication information as shown in FIG. 19, as the user authentication menu is selected as described with reference to FIG. 16.

In response to the displayed UI 1910, a user may write a character i.e., Korean character of "우리나라" as a writing input 1920 for the user authentication in a certain area of the display 110 through the input unit 200 such as the electronic pen 201.

The processor 150 may identify the writing content and pen attributes of the received writing input 1920, and identify whether the identified writing content and pen attributes match the writing content and pen attributes of the user registered as the authentication information. Here, the authentication information set in the embodiment shown in FIG. 17 may be used. Further, the processor 150 may additionally identify whether the position of the writing input 1920, for example, an area where the writing input 1920 is received among the divisional areas on the display 110 matches the position of the writing input registered as the authentication information, as well as the writing content and the pen attributes.

According to an embodiment, the electronic apparatus 100 receives the plurality of writing inputs, for example, the writing inputs 1820 and 1920 of FIGS. 18 and 19, and compares the writing content and pen attributes of the received writing inputs 1820 and 1920 with the authentication information registered as sequential combinations of the plurality of writing inputs in sequence, thereby performing the user authentication when they are matched in sequence.

Below, specific embodiments of performing the user authentication based on the plurality of writing inputs received in sequence will be described.

Figure 20:
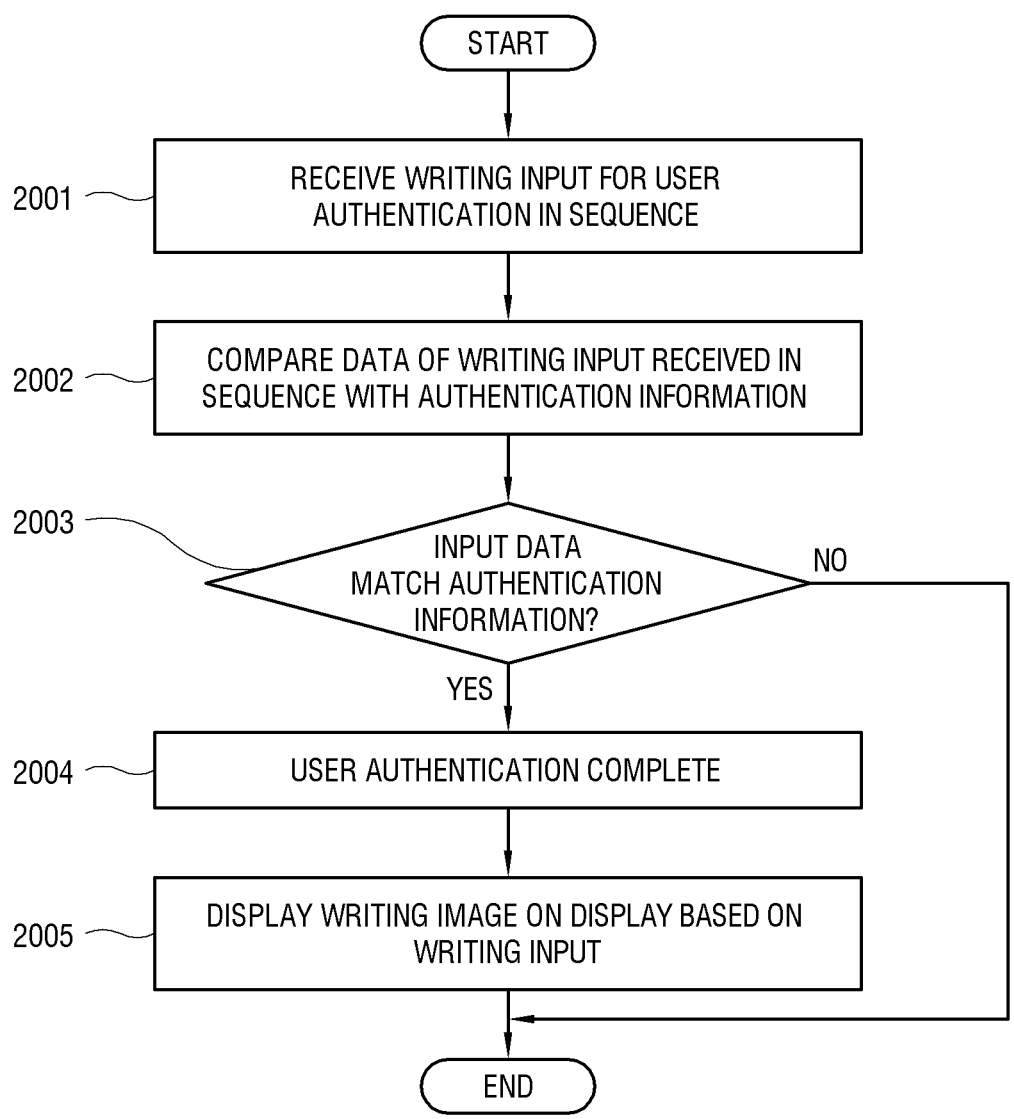
FIG. 20 is a flowchart showing operations of performing user authentication based on a writing input in an electronic apparatus according to an embodiment of the disclosure.

FIG. 20 is a flowchart showing operations of performing user authentication based on a writing input in an electronic apparatus according to an embodiment of the disclosure.

In the embodiment shown in FIG. 20, the user authentication is performed based on the writing content and pen attributes of the writing input like that shown in FIG. 3, and it is characterized in that the order of making a plurality of writing inputs received in sequence, the writing content, pen attributes, and input position of each writing input are compared with the authentication information.

According to an embodiment, in the same manner as described in the embodiments shown in FIGS. 16 and 17, the electronic apparatus 100 previously registers the plurality of writing inputs to be used as user authentication information in order, and sequentially compares the writing inputs made by a user with the writing inputs registered as the authentication information in input order, thereby identifying their matching.

Figure 21:
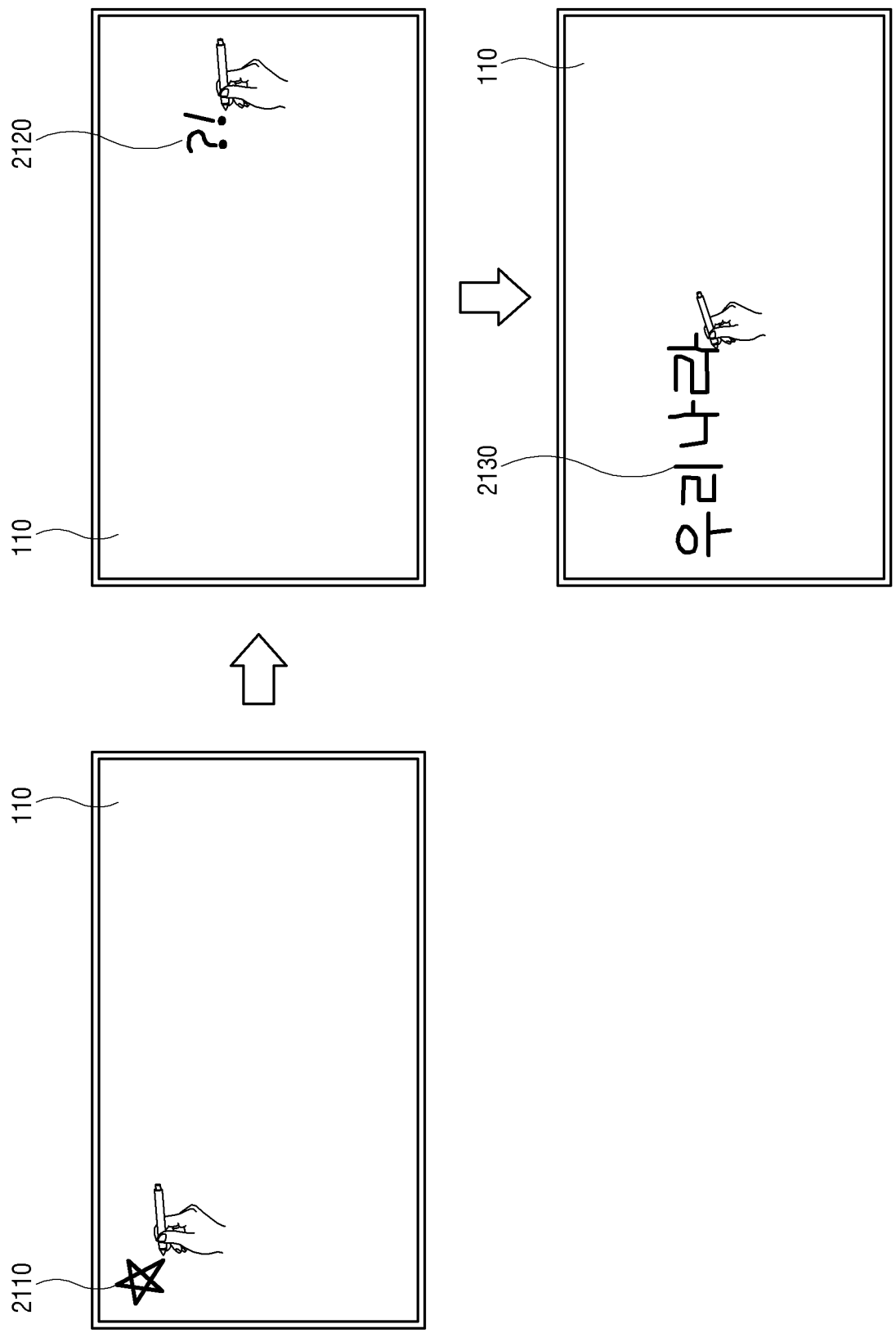
FIG. 21 shows an example that authentication information is registered in order in an electronic apparatus according to an embodiment of the disclosure.

FIG. 21 shows an example that authentication information is registered in order in an electronic apparatus according to an embodiment of the disclosure.

In the electronic apparatus 100, for example, as shown in FIG. 21, a plurality of writing inputs made in order of a FIG. 2110 of "star," a symbol 2120 of "?!" and a character 2130 of "우리나라" may be registered as the authentication information. Here, the authentication information, which has been registered for the case where the screen mode of the display 110 is the landscape mode, may be registered together with the writing content, pen attributes and input position (for example, at least one area among a plurality of areas divided on the display 110 like that of FIG. 11) previously set for each of the writing inputs 2110, 2120 and 2130.

As shown in FIG. 20, the processor 150 of the electronic apparatus 100 may receive the plurality of writing inputs for the user authentication in sequence (2001).

The processor 150 may compare the data of the plurality of writing inputs sequentially received in the operation 2001 with the previously registered authentication information (2002).

Based on comparison results from the operation 2002, the processor 150 may identify whether the data of the writing input received in the operation 2001 matches the authentication information (2003).

FIGS. 22, 23, 24 and 25 show examples of identifying whether a plurality of writing inputs matches authentication information in an electronic apparatus according to an embodiment of the disclosure.

Figure 22:
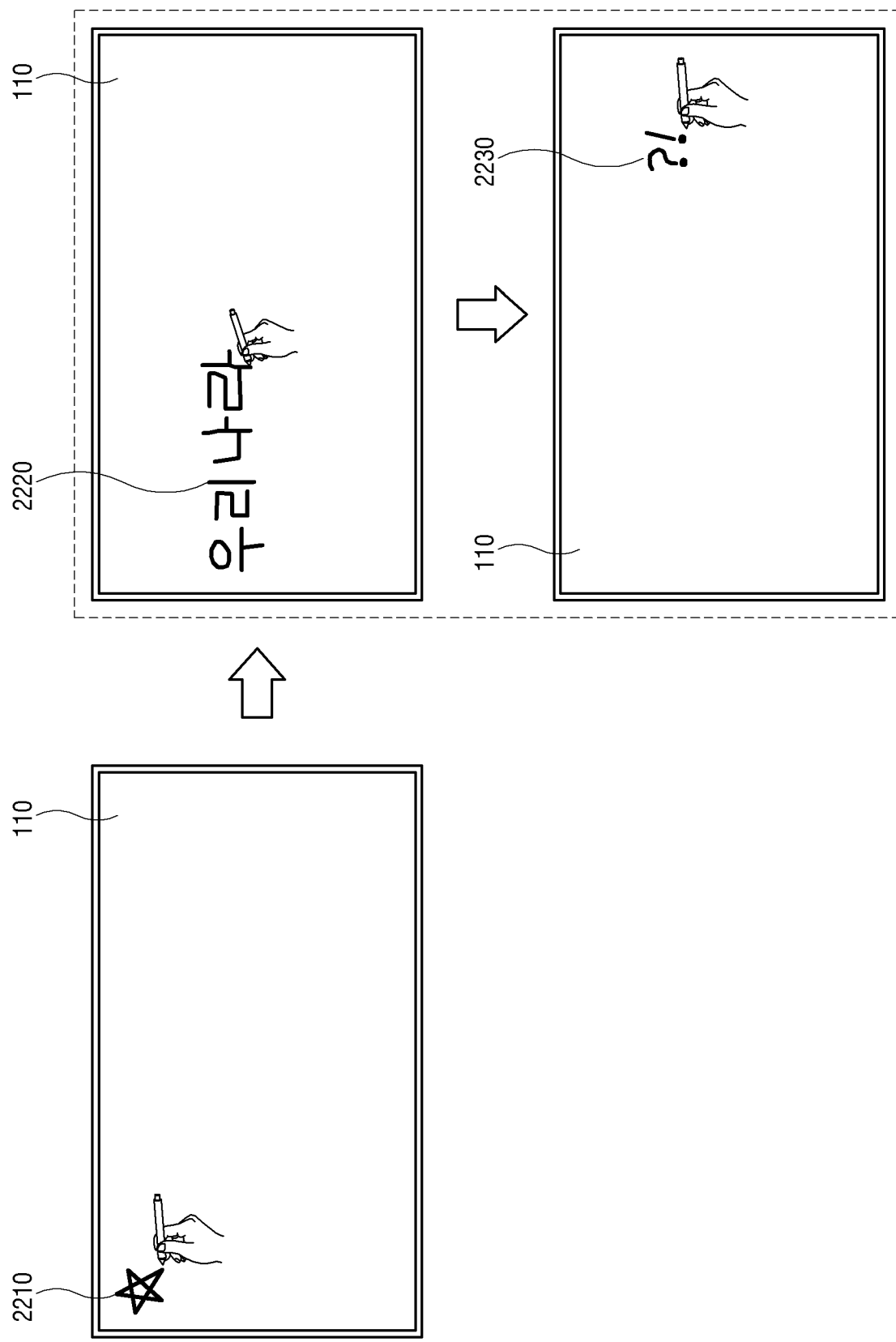
FIGS. 22, 23, 24 and 25 show examples of identifying whether a plurality of writing inputs matches authentication information in an electronic apparatus according to an embodiment of the disclosure.

Referring to FIG. 22, when a user makes the writing inputs in order of a FIG. 2210 of "star," a character 2220 of and a symbol 2230 of "?!" in the operation 2001, it is identified that the order of the writing inputs does not match the order of the registered authentication information of FIG. 21. Such a mismatched order causes an authentication information error, thereby failing in login.

Figure 23:
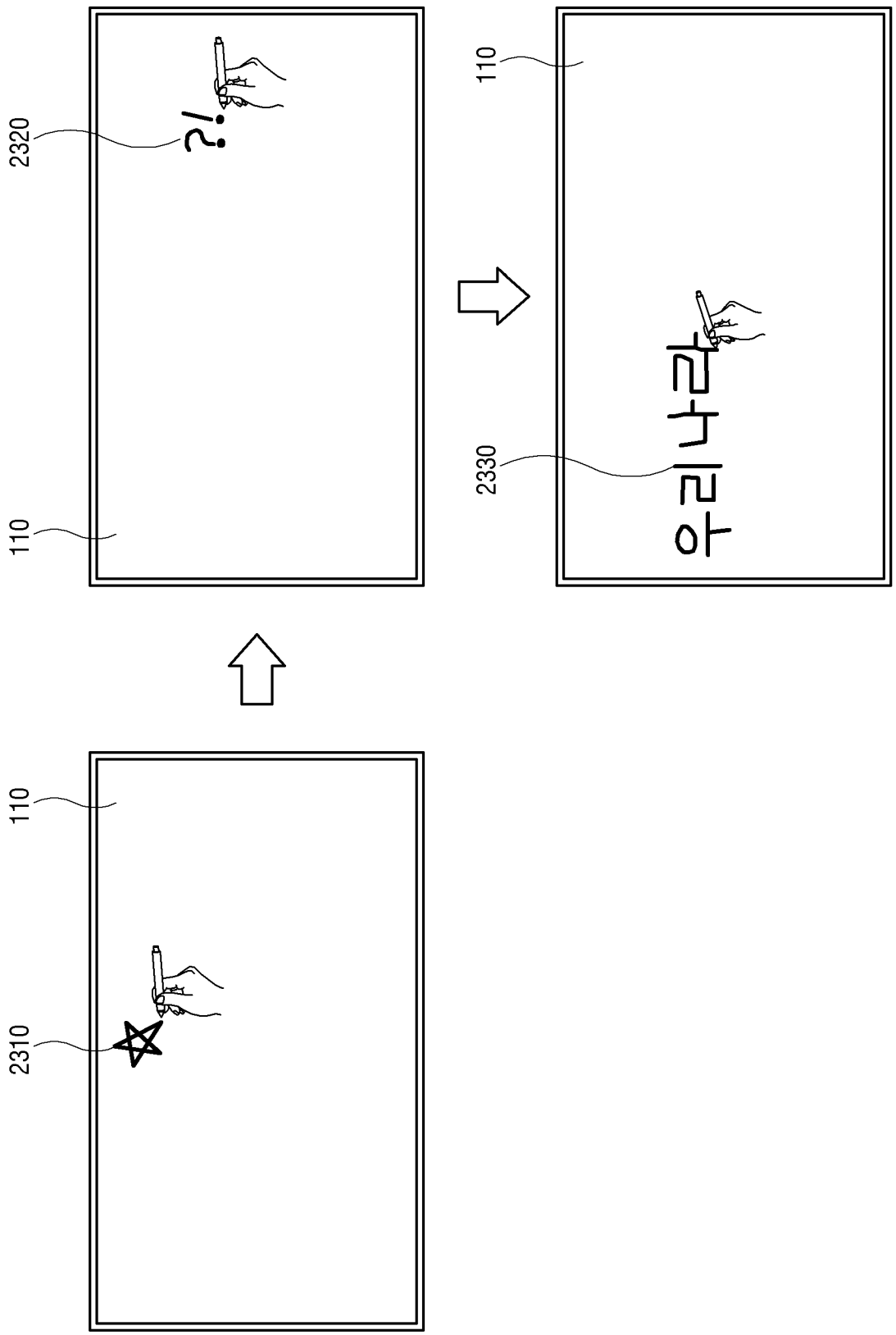

As another example, when a user makes the writing inputs as shown in FIG. 23 in order of a FIG. 2310 of "star," a symbol 2320 of "?!" and a character 2330 of "우리나라" in the operation 2001, it is identified that the input position of the FIG. 2310 of the first writing input does not match the first registered authentication information of FIG. 21. Such a mismatched input position causes an authentication information error, thereby failing in login.

Figure 24:
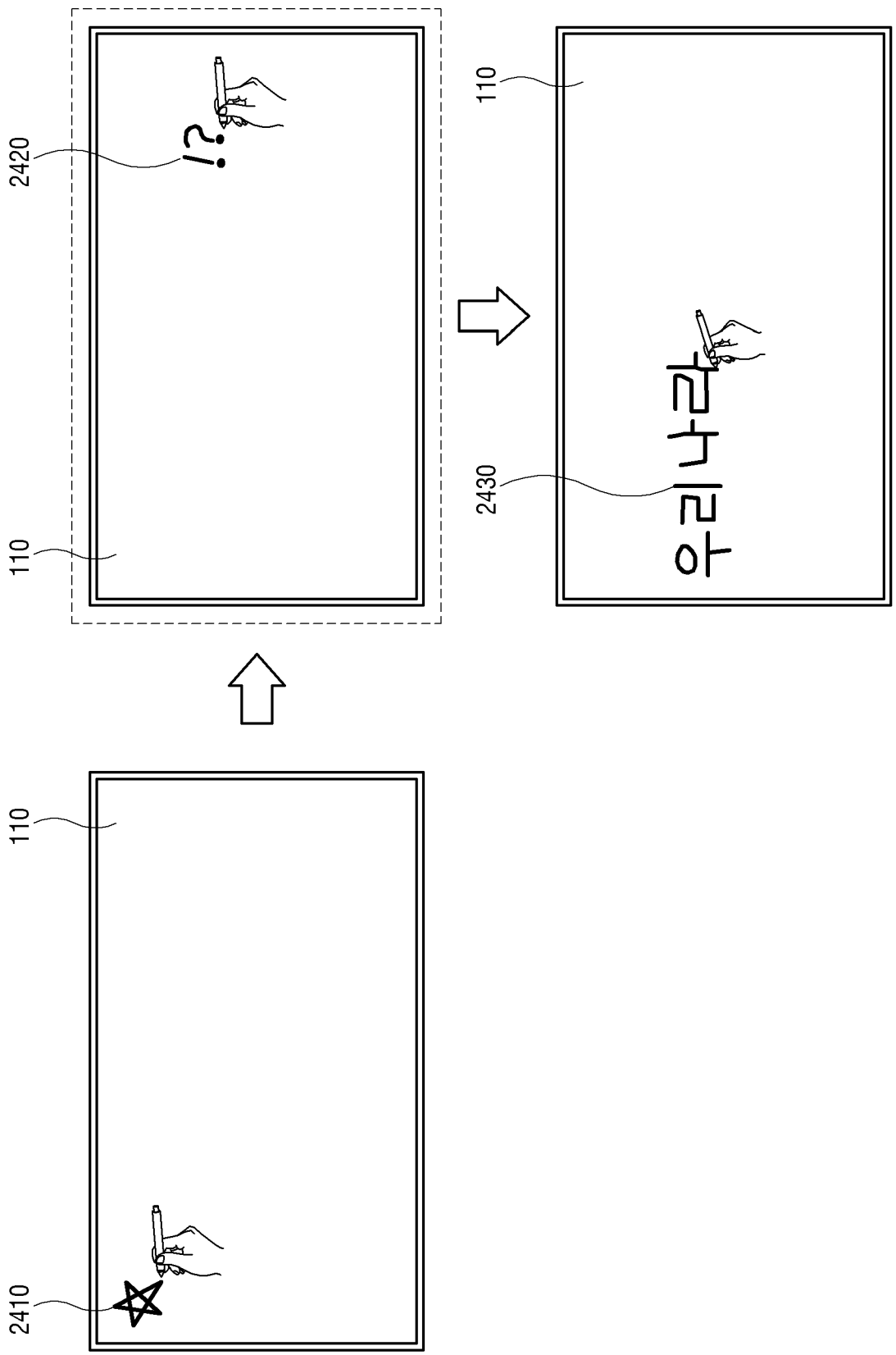

As still another example, when a user makes the writing inputs as shown in FIG. 24 in order of a FIG. 2410 of "star," a symbol 2420 of "!?" and a character 2430 of "우리나라" in the operation 2001, it is identified that the writing content of the second writing input, i.e., the symbol 2420 does not match the second registered authentication information of FIG. 21. Such mismatched wring content causes an authentication information error, thereby failing in login.

Figure 25:
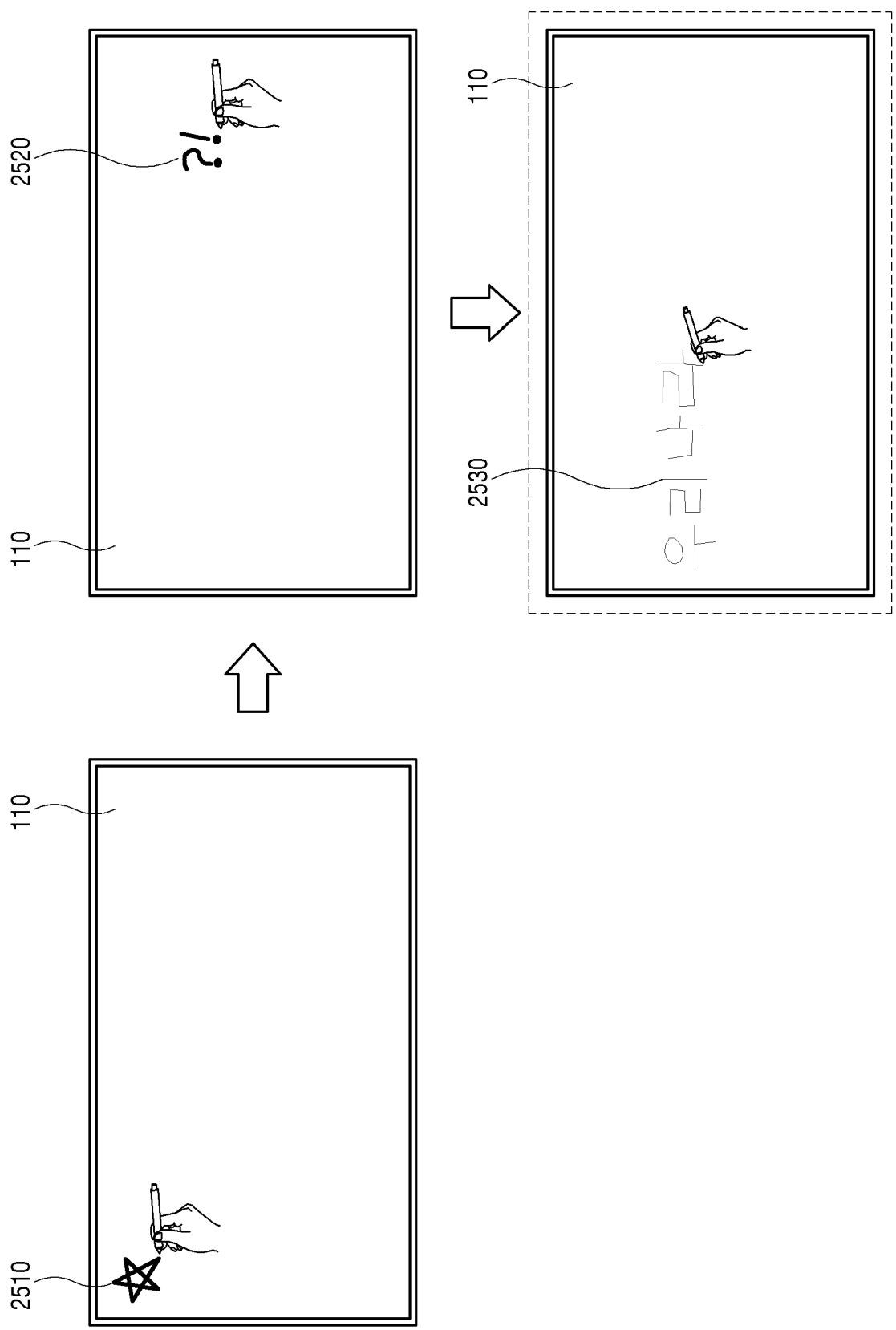

As yet another example, when a user makes the writing inputs as shown in FIG. 25 in order of a FIG. 2510 of "star," a symbol 2520 of "?!" and a character 2530 of "우리나라" in the operation 2001, it is identified that the pen attributes (e.g., thickness) of the third writing input, i.e., the character 2530 do not match the third registered authentication information of FIG. 21. Such mismatched pen attributes cause an authentication information error, thereby failing in login.

In the operation 2003, the processor 150 may identify that the data of the received writing input matches the authentication information, when the input order of the plurality of writing inputs sequentially received in the operation 2001 matches the order of the registered authentication information, and the writing content, pen attributes (e.g., color, size, pen type (or tip type), etc.), and input position of each writing input match the authentication information in order.

As described above, based on the matching identified between the data of the writing input and the authentication information in the operation 2003, the processor 150 may complete the user authentication in the electronic apparatus 100 (2004). Therefore, a user can successfully log in.

Accordingly, the processor 150 controls the display 110 to display the writing image based on the writing input made by a user, so that the user can normally use the electronic apparatus 100 (2005).

The foregoing matching identification of the authentication information may be equally applied even when the screen mode of the electronic apparatus 100 is the portrait mode.

Figure 26:
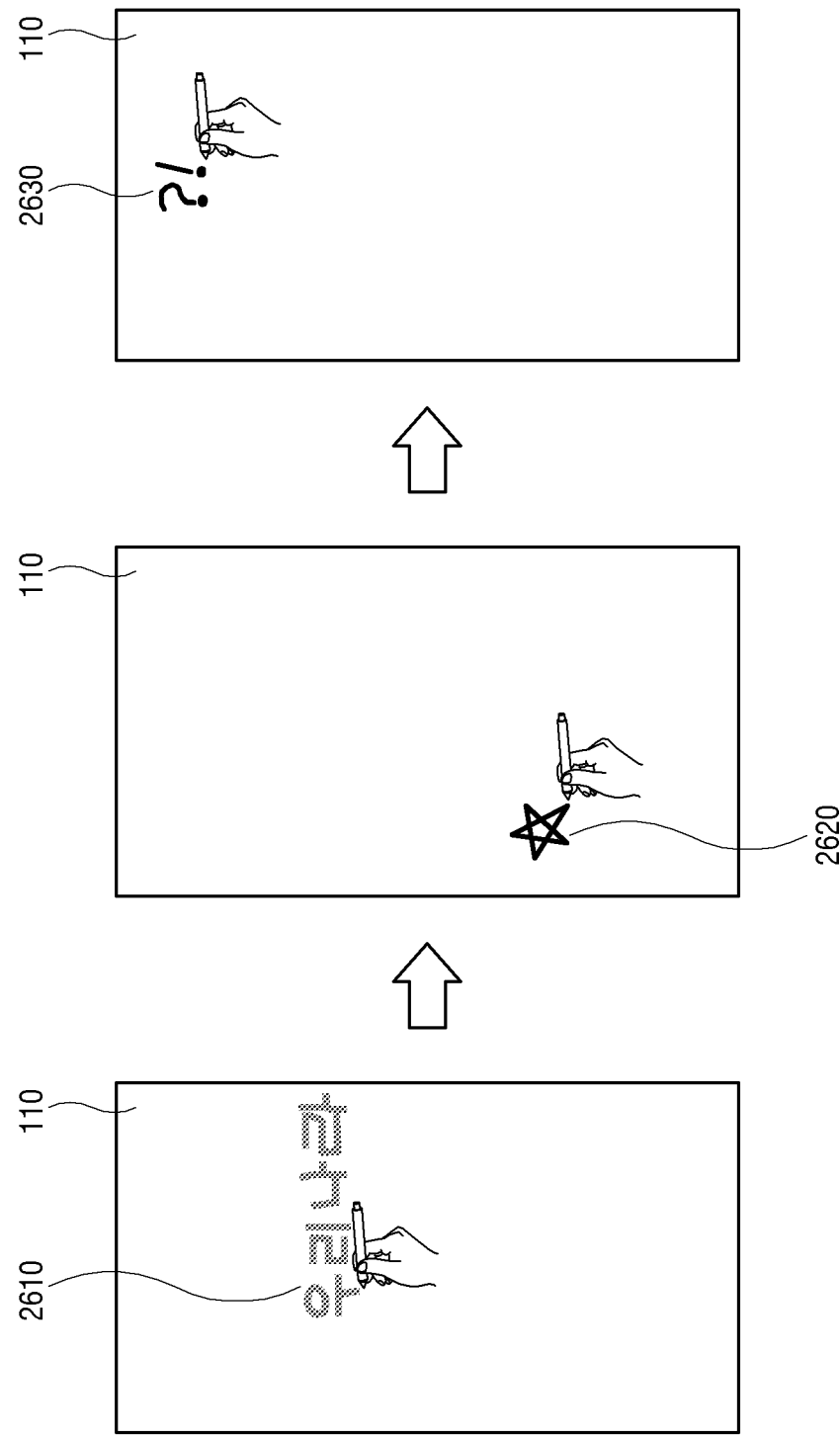
FIG. 26 shows an example of identifying whether a plurality of writing inputs matches authentication information in an electronic apparatus according to an embodiment of the disclosure.

FIG. 26 shows an example of identifying whether a plurality of writing inputs matches authentication information in an electronic apparatus according to an embodiment of the disclosure.

In the electronic apparatus 100, for example, as shown in FIG. 26, a plurality of writing inputs made in order of a character 2610 of "우리나라", a figure 2620 of "star" and a symbol 2630 of "?!" may be registered as the authentication information. Here, the authentication information, which has been registered for the case where the screen mode of the display 110 is the portrait mode, may be registered differently from the authentication information in the landscape mode described with reference to FIG. 21. In the electronic apparatus 100, the writing content, pen attributes and input position previously set for each writing input 2610, 2620 or 2630 may be registered together.

Figure 27:
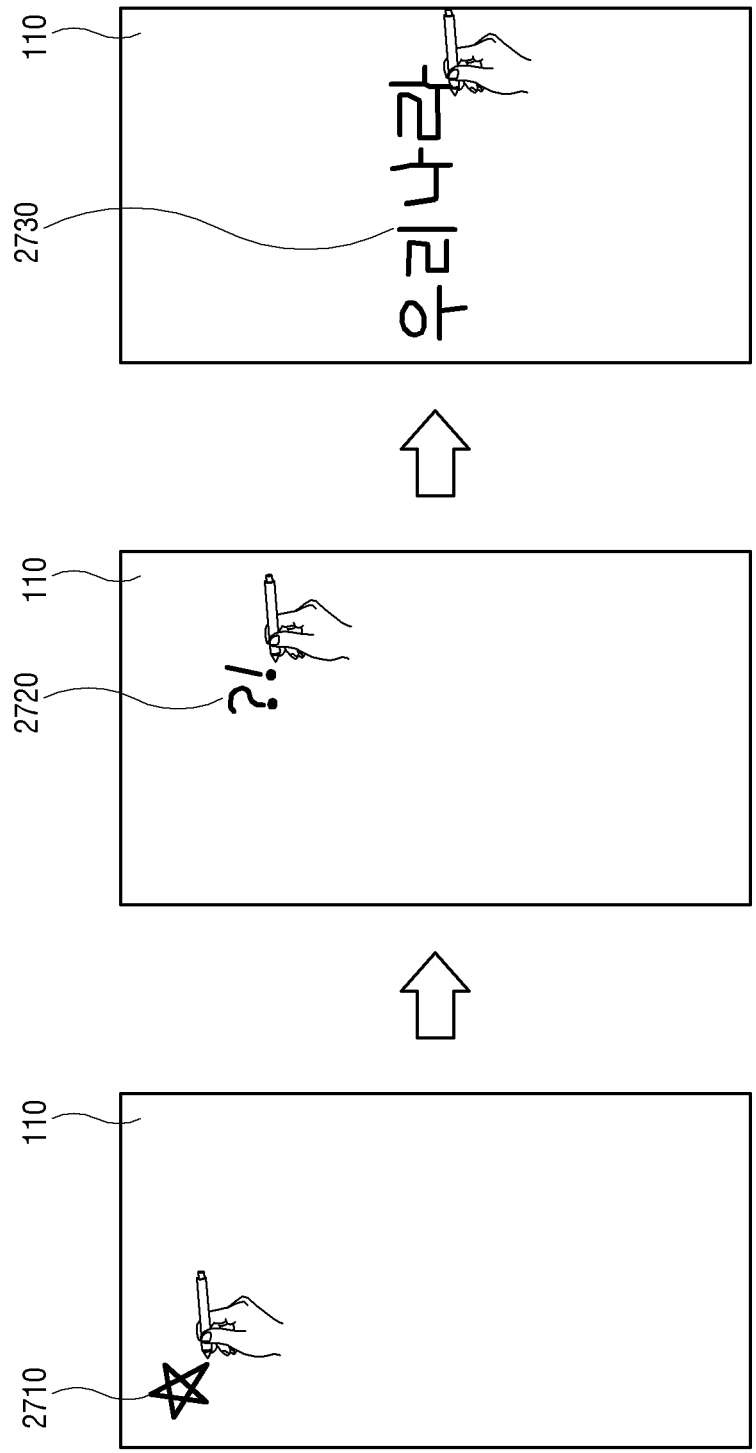
FIG. 27 shows another example of identifying whether a plurality of writing inputs matches authentication information in an electronic apparatus according to an embodiment of the disclosure.

FIG. 27 shows another example of identifying whether a plurality of writing inputs matches authentication information in an electronic apparatus according to an embodiment of the disclosure.

Referring to FIG. 27, when a user makes the writing inputs in order of a FIG. 2710 of "star," a symbol 2720 of "?!" and a character 2730 of "우리나라" in the operation 2001 of FIG. 20, it is identified that the order of the writing inputs does not match the order of the registered authentication information of FIG. 26. Further, it is also identified that the writing content of each writing input 2710, 2720 or 2730 does not match the registered authentication information 2610, 2620, 2630 of FIG. 26.

FIG. 27 illustrates that the plurality of writing inputs 2710, 2720 and 2730 are sequentially input while the screen mode of the electronic apparatus 100 is the portrait mode, and it is identified whether the plurality of writing inputs 2710, 2720 and 2730 matches the authentication information set for the portrait mode described with reference to FIG. 26.

Therefore, it is identified that the plurality of writing inputs 2710, 2720 and 2730 of FIG. 27 does not match the input data and the authentication information in the operation 2003 of FIG. 20 even though they match the authentication information for the landscape mode of FIG. 21 with respect to the input order and the writing content and pen attributes of the writing inputs.

According to the foregoing embodiments of the disclosure, the user authentication is performed when the matching is made with respect to all the input order of the plurality of writing inputs and the writing content, pen attributes and input positions of the writing inputs, and it is therefore possible to expect a high security effect in general-purpose apparatuses with the IWB or the like display. Further, the authentication information is differently set according to the screen modes of the display 110, and it is therefore possible for a user to set security information variously as necessary.

Meanwhile, the electronic apparatus 100 according to an embodiment of the disclosure may be implemented to use a device setting value as the security information.

Figure 28:
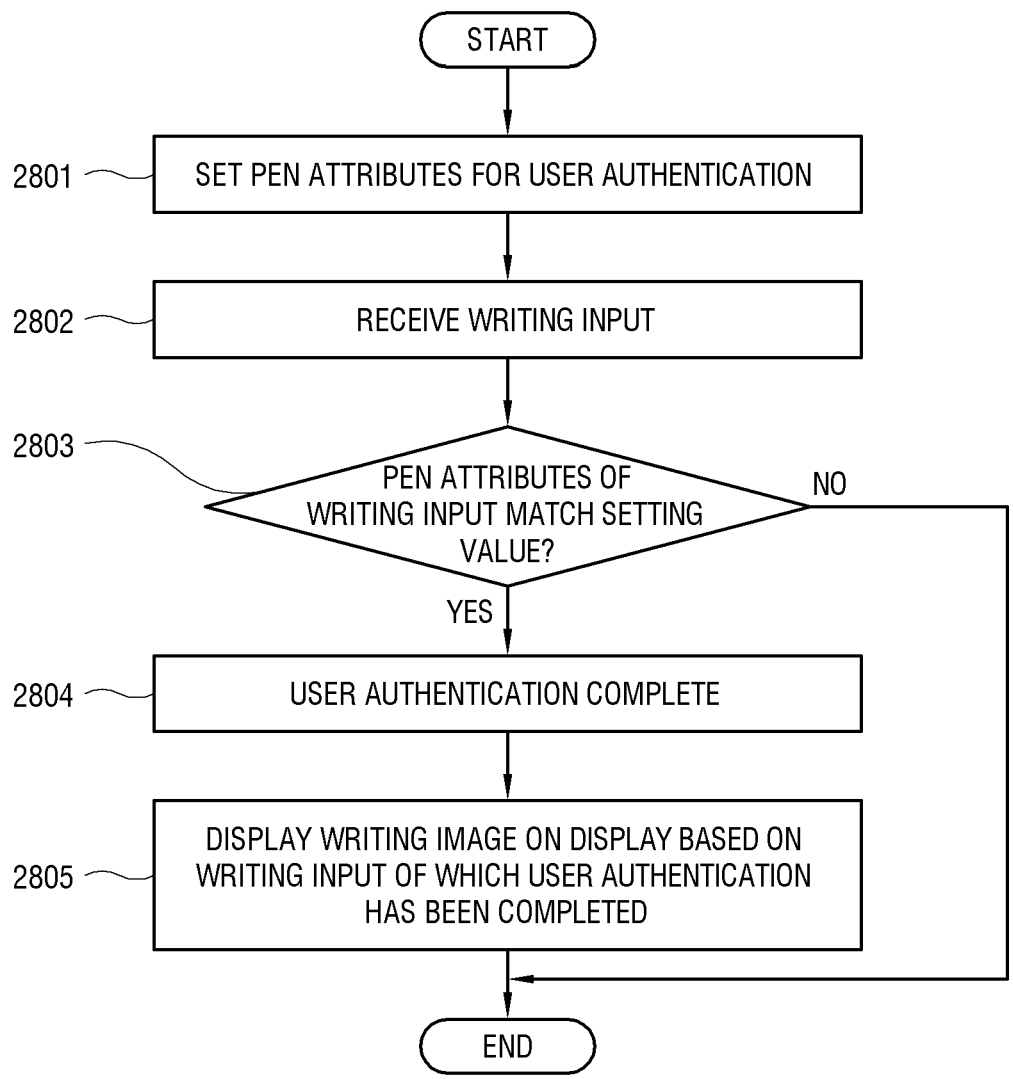
FIG. 28 is a flowchart showing operations of performing user authentication based on a device setting value through a UI in an electronic apparatus according to an embodiment of the disclosure.

FIG. 28 is a flowchart showing operations of performing user authentication based on a device setting value through a UI in an electronic apparatus according to an embodiment of the disclosure.

In the embodiment shown in FIG. 28, the user authentication is performed based on the pen attributes of the writing input like that shown in FIG. 3, and it is characterized in identifying whether the pen attributes of the writing input arbitrarily made by a user for the authentication match the pen attributes previously set/registered as the user authentication information.

In the following embodiments, it will be described by way of example that a setting value for the pen attributes of the electronic pen 201 among the device setting values is used as the authentication information.

As shown in FIG. 28, the electronic apparatus 100 may receive a user input for setting the pen attributes as a setting value for the user authentication (2801). Here, the UI may be used to register the pen attributes as the authentication information.

Figure 29:
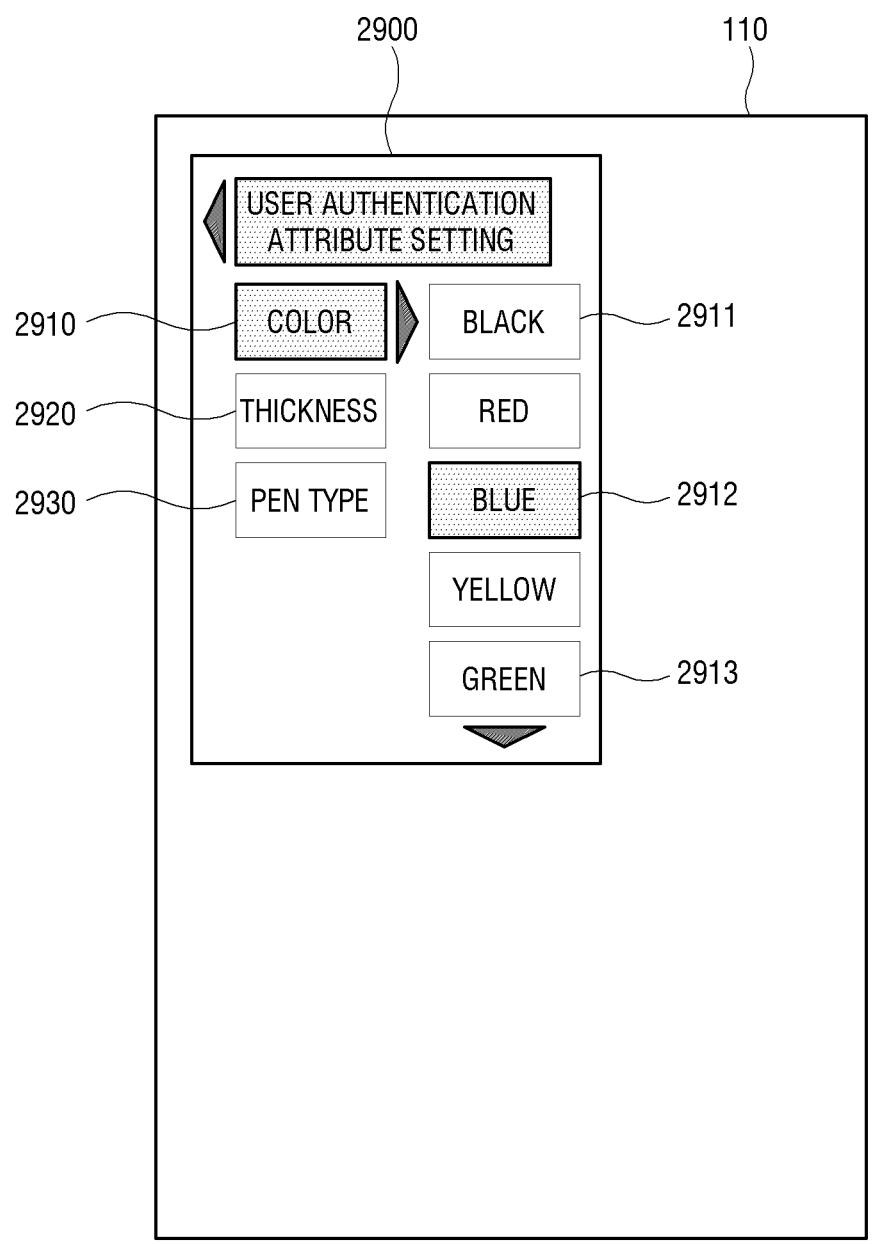
FIG. 29 shows an example of a UI for registering pen attributes as authentication information in an electronic apparatus according to an embodiment of the disclosure.
Figure 30:
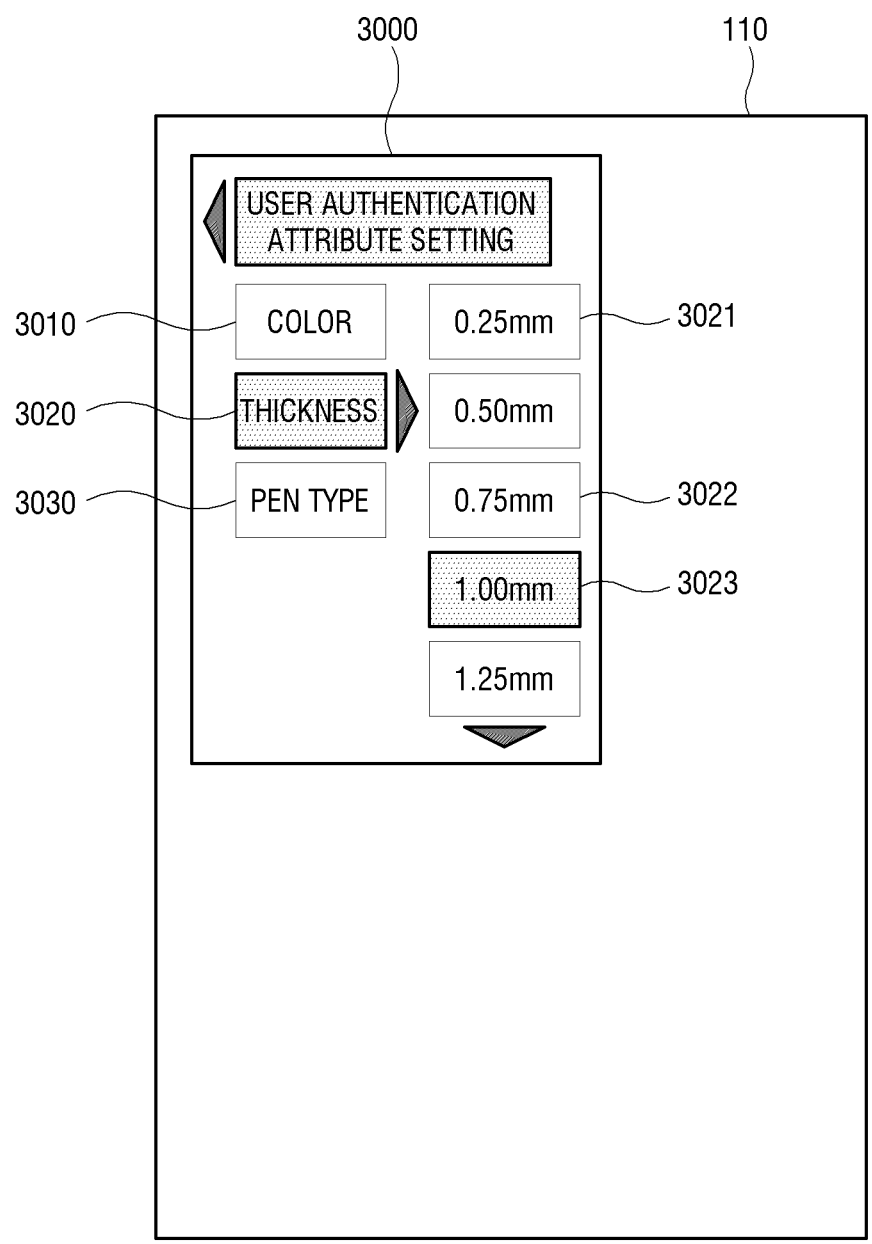
FIG. 30 shows another example of a UI for registering pen attributes as authentication information in an electronic apparatus according to an embodiment of the disclosure.

FIG. 29 shows an example of a UI for registering pen attributes as authentication information in an electronic apparatus according to an embodiment of the disclosure, and FIG. 30 shows another example of a UI for registering pen attributes as authentication information in an electronic apparatus according to an embodiment of the disclosure.

As shown in FIGS. 29 and 30, the processor 150 may control the display 110 to display UIs 2900 and 3000 for setting the pen attributes as user authentication information.

Referring to FIG. 29, The UI 2900 may include a plurality of menu items 2910, 2920, and 2930 corresponding to a plurality of pen attributes and selectable by a user.

When receiving a user input for selecting any one 2910, e.g., color among the plurality of menu items 2910, 2920, and 2930, the processor 150 may control the display 110 to display a plurality of submenu items 2911, 2912 and 2913 corresponding to the item 2910 selected by the user.

Then, the user may make an input for selecting any one 2912, e.g., red among the displayed submenu items 2911, 2912 and 2913, and the setting value for the user authentication may be set with the color corresponding to the user input. In addition, this setting value is registered as the user authentication information.

In the same manner, referring to FIG. 30, based on a user input for selecting any one 3020, e.g., thickness among a plurality of menu items 3010, 3020 and 3030 corresponding to the plurality of pen attributes, the processor 150 may control the display 110 to display a plurality of submenu items 3021, 3022 and 3023 corresponding to the selected item 3020. Then, the user may make an input for selecting any one 3023, e.g., 1.00 mm among the displayed submenu items 3011, 3012 and 3013, and the setting value for the user authentication may be set with the thickness corresponding to the user input. In addition, this setting value is registered as the user authentication information.

The electronic apparatus 100 may receive a user input through the UI with respect to the pen type (or tip type) among the plurality of pen attributes, in the same manner as those of FIG. 29 or 30. In other words, when the pen type (or tip type) 3030 is selected among the plurality of menu items 3010, 3020 and 3030, a plurality of submenu items, for example, a general pen, a highlighter, a crayon, a brush (e.g., a painting brush), a spray, etc. may be displayed corresponding to the pen type 3030, and the setting value for the user authentication may be set with the pen type corresponding to a selected item, e.g., the highlighter. In addition, this setting value is registered as the user authentication information.

As described above, after the setting (pen attributes) is made for the user authentication in the operation 2801, the electronic apparatus 100 may receive a user's writing input for the user authentication (2802). Here, the processor 150 may control the display 110 to display a UI for guiding the writing input to be made for the user authentication.

Figure 31:
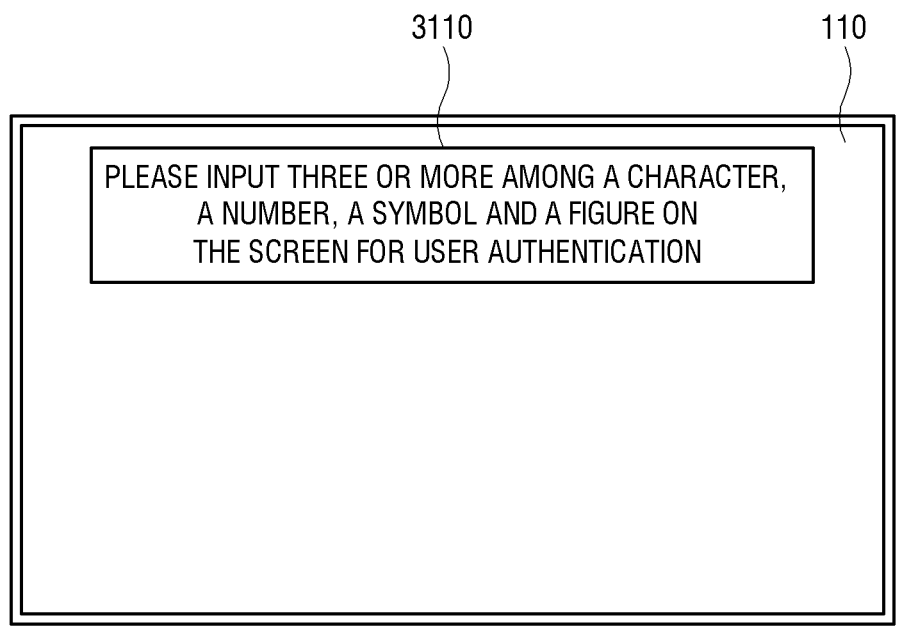
FIG. 31 illustrates a UI for guiding input of authentication information in an electronic apparatus according to an embodiment of the disclosure.
Figure 32:
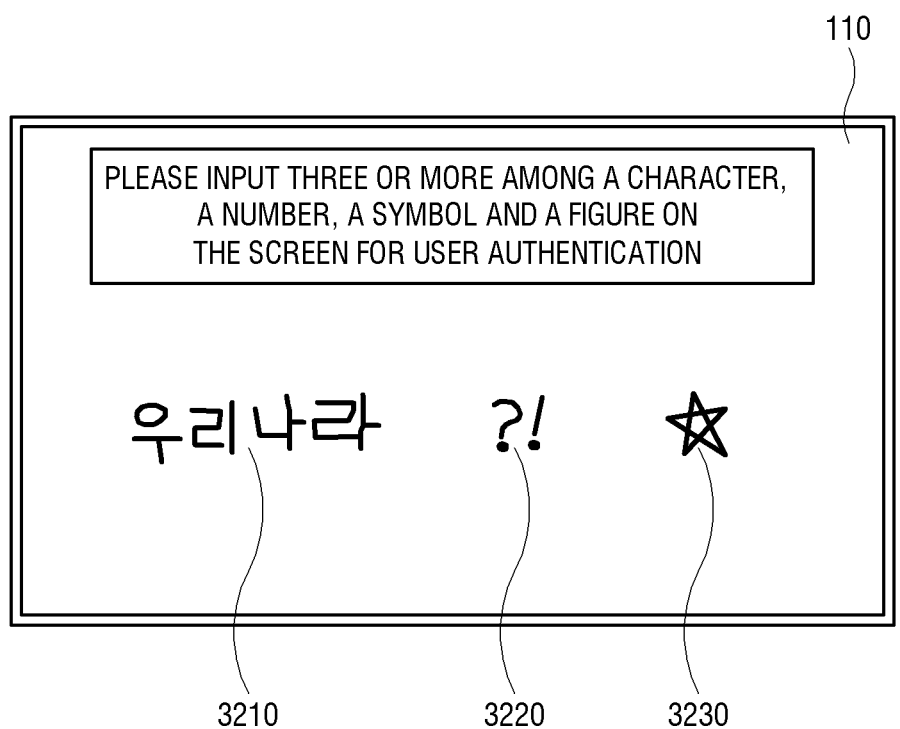
FIG. 32 shows an example of receiving a writing input for the user authentication in response to the UI of FIG. 31.
Figure 33:
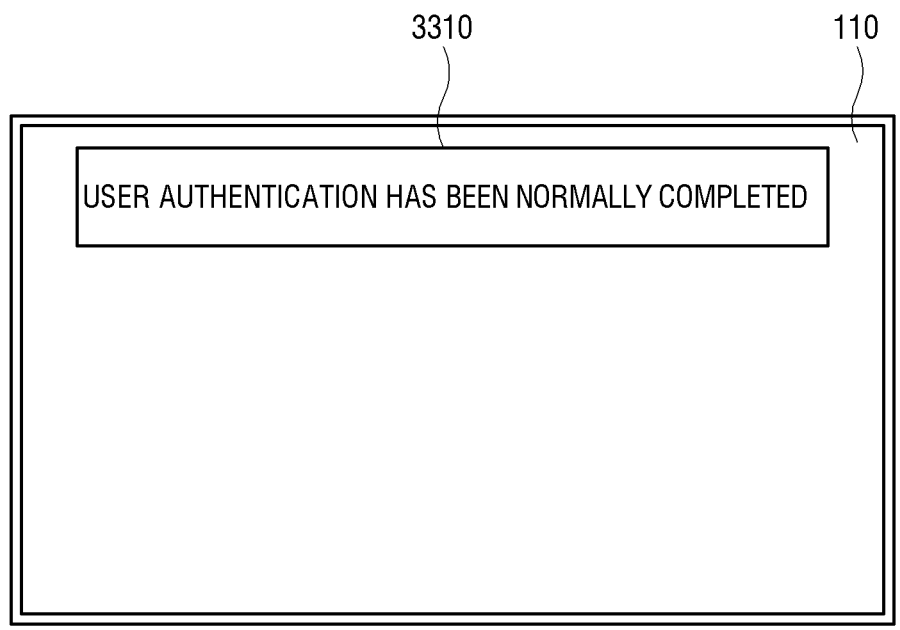
FIG. 33 shows an example of a screen indicating that user authentication has been completed in an electronic apparatus according to an embodiment of the disclosure.

FIG. 31 illustrates a UI for guiding input of authentication information in an electronic apparatus according to an embodiment of the disclosure, FIG. 32 shows an example of receiving a writing input for the user authentication in response to the UI of FIG. 31, and FIG. 33 shows an example of a screen indicating that user authentication has been completed in an electronic apparatus according to an embodiment of the disclosure.

To use the electronic apparatus 100 being in a locked state, a user needs to undergo the user authentication in the electronic apparatus 100.

To this end, the processor 150 may, as shown in FIG. 31, control the display 110 to display a UI 3110 for guiding the user to make a writing input for the user authentication.

Here, the processor 150 may display a UI for guiding a predetermined number or more of writing inputs to enhance security. FIG. 32 shows a UI for guiding three or more writing inputs by way of example, but the UI is not limited thereto.

In response to a UI 3110 displayed as shown in FIG. 31, the processor 150 may, as shown in FIG. 32, identify that a user makes a plurality of writing inputs 3210, 3220 and 3230 on the screen of the display 110. Here, a user may change the settings for the electronic apparatus 100 through the UI or the like, and make the writing input based on the changed settings.

Referring back to FIG. 28, the processor 150 may identify whether the pen attributes of the writing inputs 3210, 3220 and 3230 received in the operation 2802 match the setting values for the pent attributes set in the operation 2801 for the user authentication (2803).

Specifically, the processor 150 may identify whether the pen attributes, e.g., color, thickness and pen type (or tip type) of the plurality of writing inputs 3210, 3220 and 3230 made on the screen match the setting values set in the operation 2801.

When it is identified in the operation 2803 that the pen attributes of the writing inputs 3210, 3220 and 3230 match the setting values registered as the authentication information, the processor 150 controls the user authentication of the electronic apparatus 100 to be completed (2804). Here, the processor 150 may, as shown in FIG. 33, control the display 110 to display a UI 3310 for informing that the user authentication has been completed.

In addition, the processor 150 controls the display 110 to display the writing input based on the writing input of which the user authentication has been completed, thereby allowing a user to normally use the electronic apparatus 100.

According to an embodiment, methods according to various embodiments of the disclosure may be provided as involved in a computer program product. The computer program product may be traded as a product between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least part of the computer program product (e.g., a downloadable app) may be transitorily stored or temporarily produced in a machine-readable storage medium such as a memory of a manufacturer server, an application-store server, or a relay server.

Although a few exemplary embodiments of the disclosure have been described in detail, various changes may be made in these exemplary embodiments without departing from the scope defined in the appended claims.

What is claimed is:

1. An electronic apparatus comprising:
a display; and
a processor configured to:
receive a writing input for user authentication,
identify writing content of the writing input and pen attribute of the writing input,
control a process of authentication of a user to the electronic apparatus so that the authentication of the user is performed based on a match occurring between the identified writing content of the writing input and the pen attribute of the writing input and writing content and pen attribute obtained in association with authentication data of the user which is registered prior to the writing input being received, and
wherein the processor controls the display to display an image based on the writing content and the pen attribute in association with registering the authentication data to perform the process of authentication.

2. The electronic apparatus of claim 1, wherein the pen attribute of the writing input comprises at least one of color, thickness or pen type of the image displayed on the display based on the writing input.

3. The electronic apparatus of claim 1, wherein the processor identifies the pen attribute of the writing input based on an input of the user selecting any one pen attribute among a plurality of pen attributes.

4. The electronic apparatus of claim 3, wherein the processor controls the display to display a user interface (UI) for the selecting of any one pen attribute among the plurality of pen attributes, and identifies the selecting from among the plurality of pen attributes based on the input of the user using the displayed UI.

5. The electronic apparatus of claim 3, wherein
the pen attribute of the writing input is among plural pen attributes, and
the processor controls a plurality of UIs to be sequentially displayed by the display in correspondence with the plural pen attributes of the writing input, and identifies the plural pen attributes of the writing input based on an input of the user using the sequentially displayed plurality of UIs.

6. The electronic apparatus of claim 1, wherein the processor is configured to:
identify a position of the writing input, and
perform the user authentication based on whether the identified position of the writing input matches a position of the writing input obtained in association with the authentication data of the user registered prior to the writing input being received.

7. The electronic apparatus of claim 6, wherein the processor identifies the position of the writing input based on an area, in which the writing input is received, among a plurality of areas on the display.

8. The electronic apparatus of claim 1, wherein the processor is configured to:
identify an input pattern of the writing input based on at least one of an order, a direction or a number of strokes making the writing input, and
perform the user authentication based on whether the identified input pattern matches a pattern of the writing input obtained in association with the authentication data of the user registered prior to the writing input being received.

9. The electronic apparatus of claim 1, wherein the writing input is among a plurality of writing inputs, and the processor is configured to:
identify whether an input order of the plurality of writing inputs made in sequence matches an order of writing inputs obtained in association with the authentication data of the user, and
identify whether the input order of the writing content and pen attributes of the plurality of writing inputs match an order of writing content and pen attributes of the user registered prior to the plurality of writing inputs being input.

10. A method of controlling an electronic apparatus, the method comprising:
receiving a writing input for user authentication;
identifying writing content of the writing input and pen attribute of the writing input;
control a process of authentication of a user to the electronic apparatus so that the authentication of the user is performed based on a match occurring between the identified writing content of the writing input and the pen attribute of the writing input and writing content and pen attribute obtained in association with authentication data of the user which is registered prior to the writing input being received; and wherein an image is displayed on a display of the electronic apparatus based on the writing content and the pen attribute in association with registering the authentication data to perform the process of authentication.

11. The method of claim 10, wherein the pen attribute of the writing input comprises at least one of color, thickness or pen type of the image displayed on the display based on the writing input.

12. The method of claim 10, wherein the identifying of the pen attribute the writing input comprises identifying the pen attribute based on an input of the user for selecting any one pen attribute among a plurality of pen attributes.

13. The method of claim 12, wherein
the pen attribute of the writing input is among plural pen attributes, and
the identifying the pen attribute of the writing input comprises:

controlling the display to sequentially display a plurality of UIs corresponding to the plural of pen attributes of the writing input, and
identifying the plural pen attributes of the writing input based on an input of the user using the sequentially displayed plurality of UIs.

14. The method of claim 10, further comprising:
identifying a position of the writing input,
wherein the user authentication is performed based on whether the identified position of the writing input matches a position of the writing input obtained in association with the authentication data of the user registered prior to the writing input being received.

15. The method of claim 10, further comprising:
identify an input pattern of the writing input based on at least one of an order, a direction or a number of strokes making the writing input,
wherein the user authentication is performed based on whether the identified input pattern matches a pattern of the writing input obtained in association with the authentication data of the user registered prior to the writing input being received.

* * * * *